United States Patent [19]
Nagai et al.

[11] Patent Number: 6,084,326
[45] Date of Patent: Jul. 4, 2000

[54] ACTUATOR

[75] Inventors: Shigekazu Nagai, Tokyo; Hiroyuki Shiomi, Ibaraki-ken, both of Japan

[73] Assignee: SMC Kabushiki Kaisha, Tokyo, Japan

[21] Appl. No.: 09/241,285

[22] Filed: Feb. 1, 1999

[30] Foreign Application Priority Data

Feb. 4, 1998 [JP] Japan ................................. 10-023677
Jun. 15, 1998 [JP] Japan ................................. 10-167501

[51] Int. Cl.[7] .......................... H02K 7/06; H02K 41/04;
H02K 49/00; H02K 5/10; F16H 1/18
[52] U.S. Cl. ........................ 310/80; 310/103; 310/104;
310/12; 464/29; 74/424.8 R
[58] Field of Search .................................. 310/80, 75 R,
310/103, 12, 20, 83, 13, 27, 37, 15, 266,
104, 75 D; 74/63, 89.15, 424.8 R; 254/204,
231, 98; 198/619, 811, 690.1; 104/156,
138.1; 464/29

[56] References Cited

U.S. PATENT DOCUMENTS

| | | | |
|---|---|---|---|
| 3,483,412 | 12/1969 | Bakker et al. ........................... | 310/103 |
| 3,573,517 | 4/1971 | Osterstrom ............................. | 310/103 |
| 3,640,138 | 2/1972 | Hahn et al. .............................. | 74/89.15 |
| 3,730,488 | 5/1973 | Gardner, Jr. ............................ | 366/262 |
| 3,814,962 | 6/1974 | Baermann ............................... | 310/103 |
| 3,824,420 | 7/1974 | Stegeman et al. ....................... | 310/89 |
| 3,825,781 | 7/1974 | Woods ..................................... | 310/90 |
| 3,936,683 | 2/1976 | Walker ..................................... | 310/103 |
| 4,201,935 | 5/1980 | Fukuma et al. .......................... | 318/15 |
| 4,246,505 | 1/1981 | Yasaka et al. ........................... | 310/218 |
| 4,306,128 | 12/1981 | Innami et al. ........................... | 218/141 |
| 5,109,720 | 5/1992 | Kasuga ................................... | 74/89.15 |
| 5,130,585 | 7/1992 | Iwamatsu et al. ....................... | 310/59 |
| 5,158,279 | 10/1992 | Laffey et al. ........................... | 271/272 |
| 5,179,304 | 1/1993 | Kenjo et al. ............................ | 310/12 |
| 5,440,183 | 8/1995 | Denne ..................................... | 310/12 |
| 5,454,278 | 10/1995 | Kasuga ................................... | 74/459 |
| 5,514,925 | 5/1996 | Worthington et al. .................. | 310/103 |
| 5,715,504 | 2/1998 | Sahay ..................................... | 399/277 |
| 5,844,340 | 12/1998 | Noda ....................................... | 310/103 |
| 5,854,521 | 12/1998 | Nolle ....................................... | 310/12 |

FOREIGN PATENT DOCUMENTS 5-176496  7/1993  Japan .

*Primary Examiner*—Nestor Ramirez
*Assistant Examiner*—Dang Dinh Le
*Attorney, Agent, or Firm*—Oblon, Spivak, McClelland, Maier & Neustadt, P.C.

[57] ABSTRACT

A ball screw of an actuator is inserted through a displacement member. Driving-side axial magnetic patterns and driving-side circumferential magnetic patterns are formed on an outer circumference of the displacement member. The ball screw and the displacement member are surrounded by a tube. A slider is provided at the outside of the tube. Driven-side axial magnetic patterns opposing to the driving-side axial magnetic patterns and driven-side circumferential magnetic patterns opposing to the driving-side circumferential magnetic patterns are formed on the slider. Mutual magnetic attraction between the driving-side patterns and the driven-side patterns prevents the displacement member from rotation, and it causes the slider to make displacement in the axial direction together with the displacement member. Since the ball screw of the actuator is surrounded by the tube, the actuator can be prevented from scattering of lubricating oil, dust or the like.

22 Claims, 22 Drawing Sheets

ACTUATOR

BACKGROUND OF THE INVENTION

1. Field of the Invention

The present invention relates to an actuator for converting rotary motion generated by a rotary driving source into rectilinear motion so that a slider is displaced in accordance with an action of the rectilinear motion.

2. Description of the Related Art

An actuator based on the use of a feed screw has been hitherto used as a driving source for transporting a workpiece or the like. As shown in FIG. 26, for example, such an actuator 10 comprises a ball screw 16 provided on a rotary shaft of a motor 12, and a displacement member 18 meshed with the ball screw 16. A guide section 22 of a frame 20 is engaged with the displacement member 18 to prevent the displacement member 18 from rotation. When the motor 12 is operated, the rotary motion of the ball screw 16 is converted by the displacement member 18 into the rectilinear motion. Thus, the displacement member 18 is displaced along the guide section 22.

However, in the case of the actuator 10 concerning the conventional technique as described above, it is feared that the lubricating oil or the like adhered to the ball screw 16 may be scattered, and the working environment may be polluted therewith. For this reason, a problem arises in that such an actuator 10 cannot be used, for example, in the environment to be kept away from dust or the like, such as those in a clean room to be used for the steps of producing semiconductor products. In order to avoid such an inconvenience, it is conceived that the ball screw 16 is covered with a bellows-shaped cover. However, such a cover involves a problem in that it has poor durability.

SUMMARY OF THE INVENTION

A general object of the present invention is to provide an actuator which makes it possible to decrease scattering of lubricating oil, dust, and the like.

A principal object of the present invention is to provide an actuator which makes it possible to convert rotary motion of a feed screw into rectilinear motion by using a displacement member and transmit the rectilinear motion to a slider which is held in a non-contact state with respect to the displacement member.

Another object of the present invention is to provide an actuator which makes it possible to avoid scattering of lubricating oil, dust, and the like from a feed screw by surrounding the feed screw with a tube.

Still another object of the present invention is to provide an actuator which makes it possible to dispense with lubricating oil to be applied for a feed screw and a displacement member, by holding the feed screw and the displacement member in a non-contact state.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The actuator according to the present invention will be explained in detail below with reference to the accompanying drawings, as exemplified by preferred embodiments.

Figure 1:
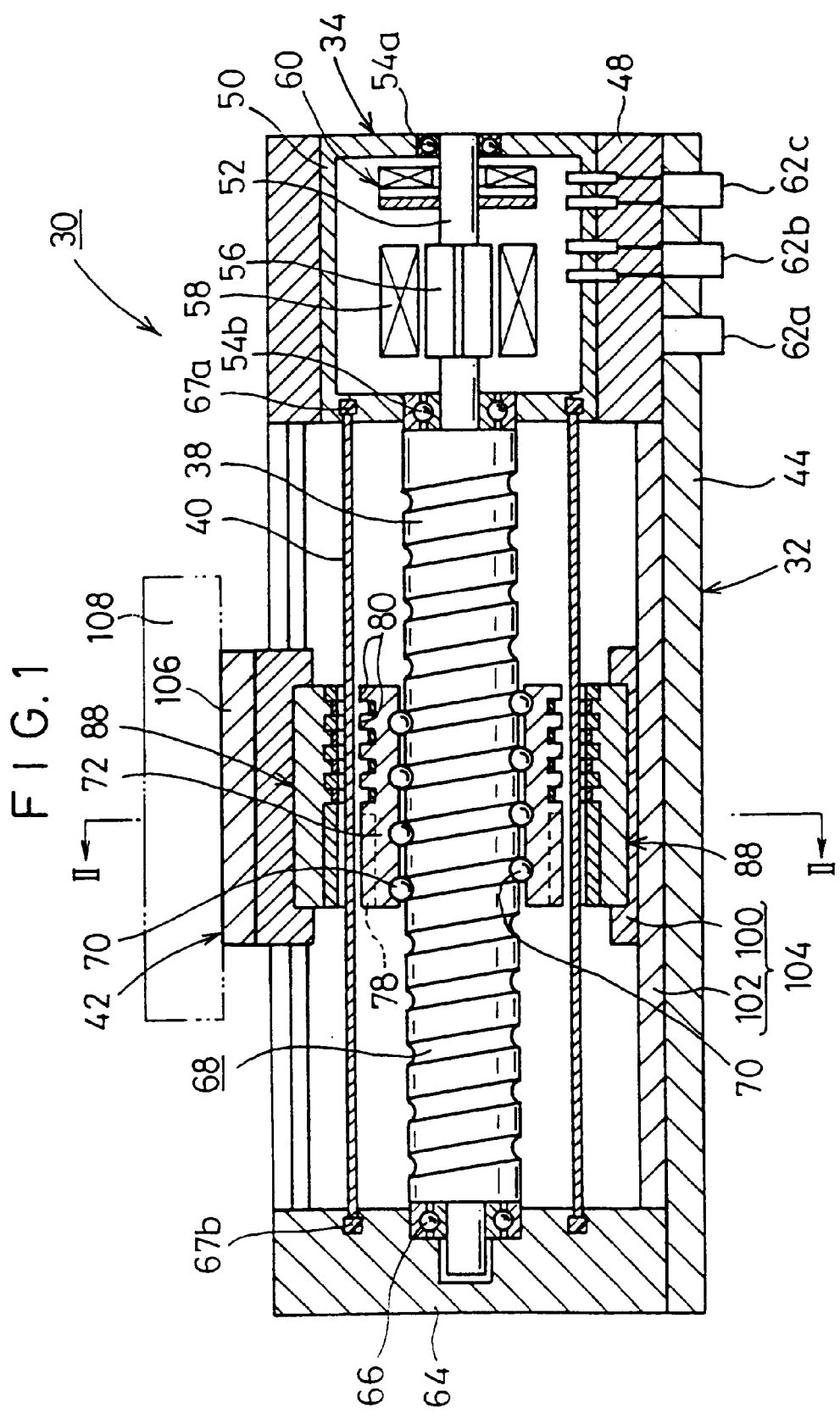
FIG. 1 shows a schematic longitudinal sectional view illustrating an actuator according to a first embodiment of the present invention.
Figure 2:
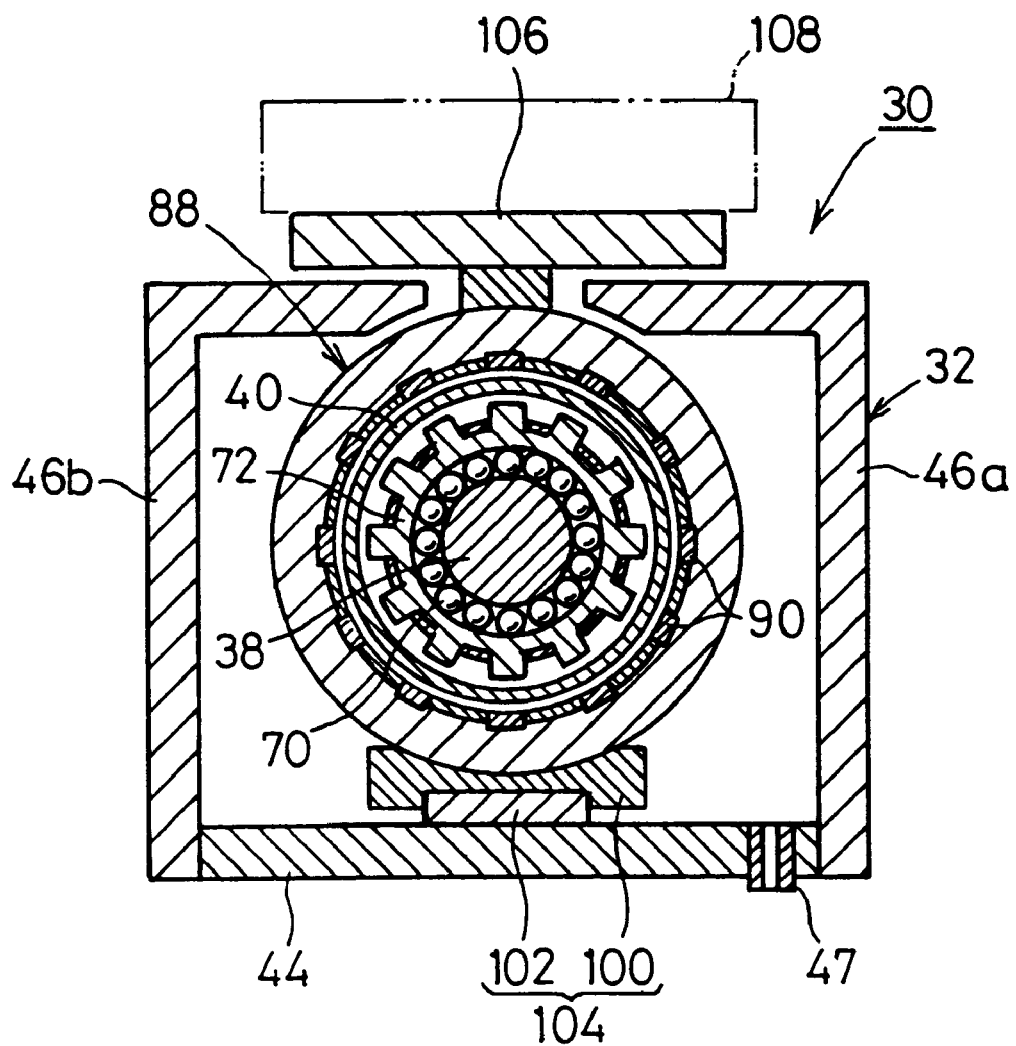
FIG. 2 shows a sectional view taken along a line II—II illustrating the actuator shown in FIG. 1.

With reference to FIGS. 1 and 2, reference numeral 30 indicates an actuator according to a first embodiment of the present invention. The actuator 30 comprises a casing 32 which is formed to have a lengthy size, an AC servomotor 34 which is provided as a rotary driving source arranged on one end side of the casing 32, a ball screw (feed screw) 38 which is rotated by the AC servomotor 34, a tube 40 which surrounds the ball screw 38, and a displacement mechanism 42 which is displaceable in the longitudinal direction of the casing 32 by the aid of the ball screw 38.

As shown in FIG. 2, the casing 32 has a base member 44 which is arranged at a lower portion of the actuator 30, and side frames 46a, 46b which are arranged on both sides of the actuator 30. The base member 44 is provided with a joint 47. The inside of the casing 32 communicates with the outside via the joint 47. A rail member 102, which extends in the longitudinal direction, is secured to the top of the base member 44. As shown in FIG. 1, an end plate 48 is secured to one end of the base member 44. The end plate 48 is provided with a housing 50 for the AC servomotor 34. A rotary shaft 52 is rotatably supported at the inside of the housing 50 with the aid of bearings 54a, 54b. A plurality of magnets 56 are secured to the rotary shaft 52. A plurality of stator windings 58, which are provided in the housing 50, are arranged on the outer circumferences of the magnets 56. An encoder 60 is provided on the rotary shaft 52. Although not shown, the actuator 30 is provided with a position-detecting switch for outputting a signal when the displacement mechanism 42 is displaced to a predetermined position. The position-detecting switch, the stator windings 58, and the encoder 60 are connected to connectors 62a to 62c disposed at lower portions of the base member 44.

A first end of the ball screw 38 is integrally coupled to the rotary shaft 52. A second end of the ball screw 38 is rotatably supported by a bearing 66 on an end plate 64 which is secured to an end of the base member 44. Both ends of the tube 40 are supported by the end plate 64 and the housing 50. Seal members 67a, 67b are provided at ends of the tube 40. Accordingly, the inside of the tube 40 is held in an air-tight manner. A ball groove 68 is defined helically on the ball screw 38. A plurality of ball members 70 are rollably engaged with the ball groove 68.

Figure 3:
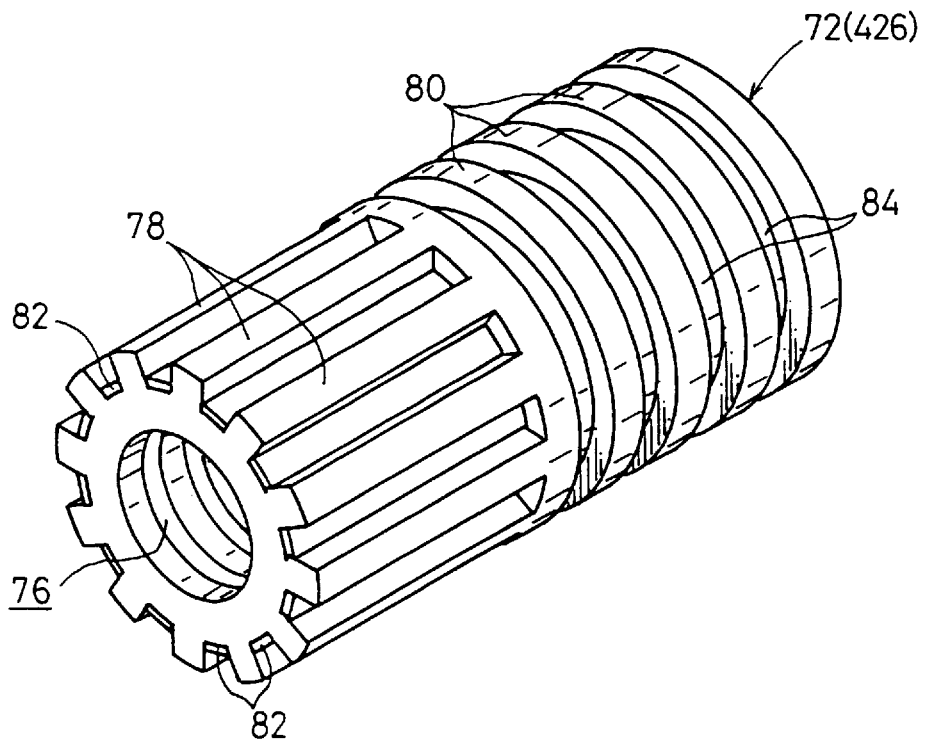
FIG. 3 shows a schematic perspective view illustrating a displacement member used for the actuator shown in FIG. 1.
Figure 4:
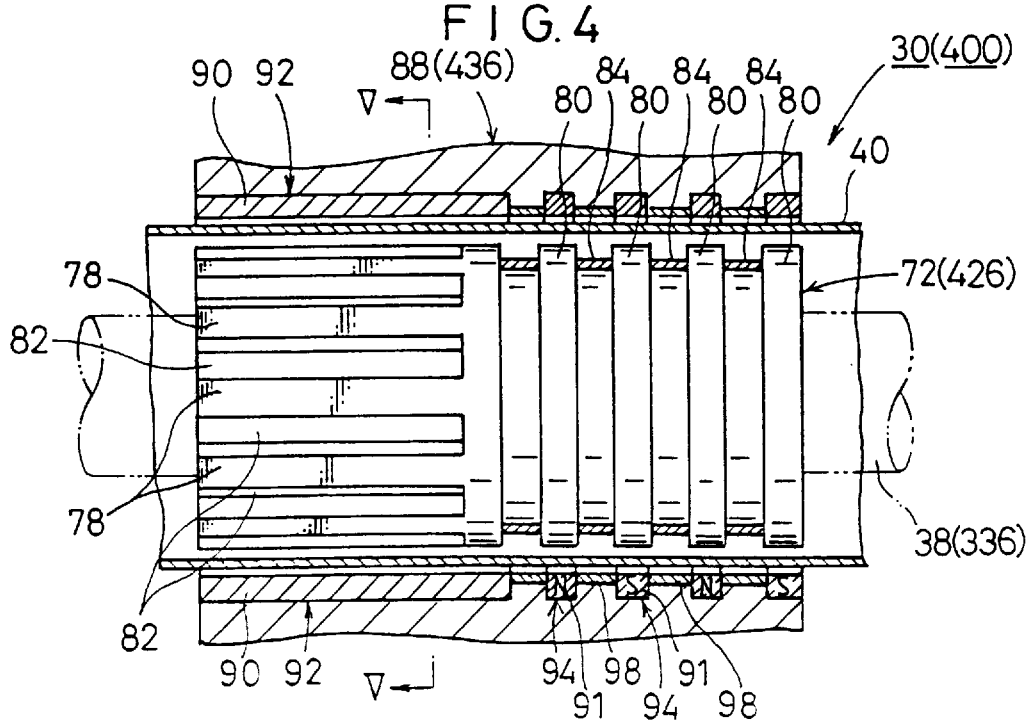
FIG. 4 shows a schematic longitudinal sectional view illustrating the displacement member and a slider of the actuator shown in FIG. 1.

The ball screw 38 is inserted through a displacement member 72 which constitutes the displacement mechanism 42. As shown in FIGS. 3 and 4, the displacement member 72 is formed of a magnetic material such as iron to have a substantially cylindrical configuration. A ball groove 76, with which the ball members 70 are rollably engaged, is defined on the inner surface of the displacement member 72. A plurality of driving-side axial magnetic patterns (magnetic poles) 78, which extend along the axial direction, are formed to protrude on the outer circumference on a first end side of the displacement member 72. The respective driving-side axial magnetic patterns 78 are arranged and separated from each other by predetermined spacing distances in the circumferential direction. On the other hand, a plurality of driving-side circumferential magnetic patterns (magnetic poles) 80, which extend in the circumferential direction, are formed to protrude on the outer circumference on a second end side of the displacement member 72. The respective driving-side circumferential magnetic patterns 80 are arranged and separated from each other by predetermined spacing distances in the axial direction. In order to avoid leakage of the magnetic force, magnetic shieldings 82, each of which is formed of a non-magnetic member such as aluminum and copper, are fitted to gaps between the adjacent driving-side axial magnetic patterns 78 on the outer circumference of the displacement member 72 (see FIGS. 5 and 6). Magnetic shieldings 84 are also fitted to gaps between the adjacent driving-side circumferential magnetic patterns 80 (see FIG. 4). The driving-side axial magnetic patterns 78 and the driving-side circumferential magnetic patterns 80, which have convex configurations, are slightly separated from the inner circumference of the tube 40.

Figure 5:
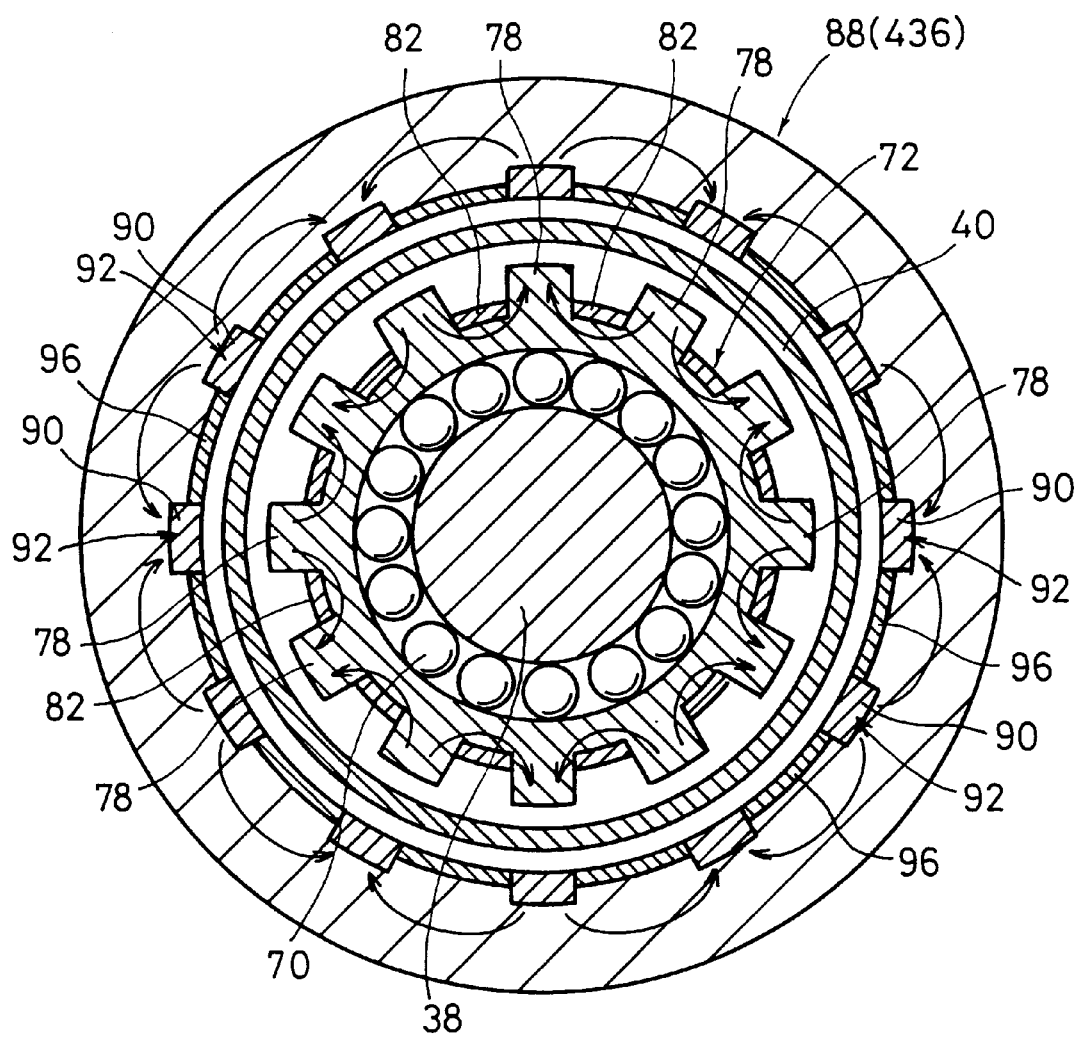
FIG. 5 shows a sectional view taken along a line V—V illustrating the displacement member and the slider shown in FIG. 4.
Figure 6:
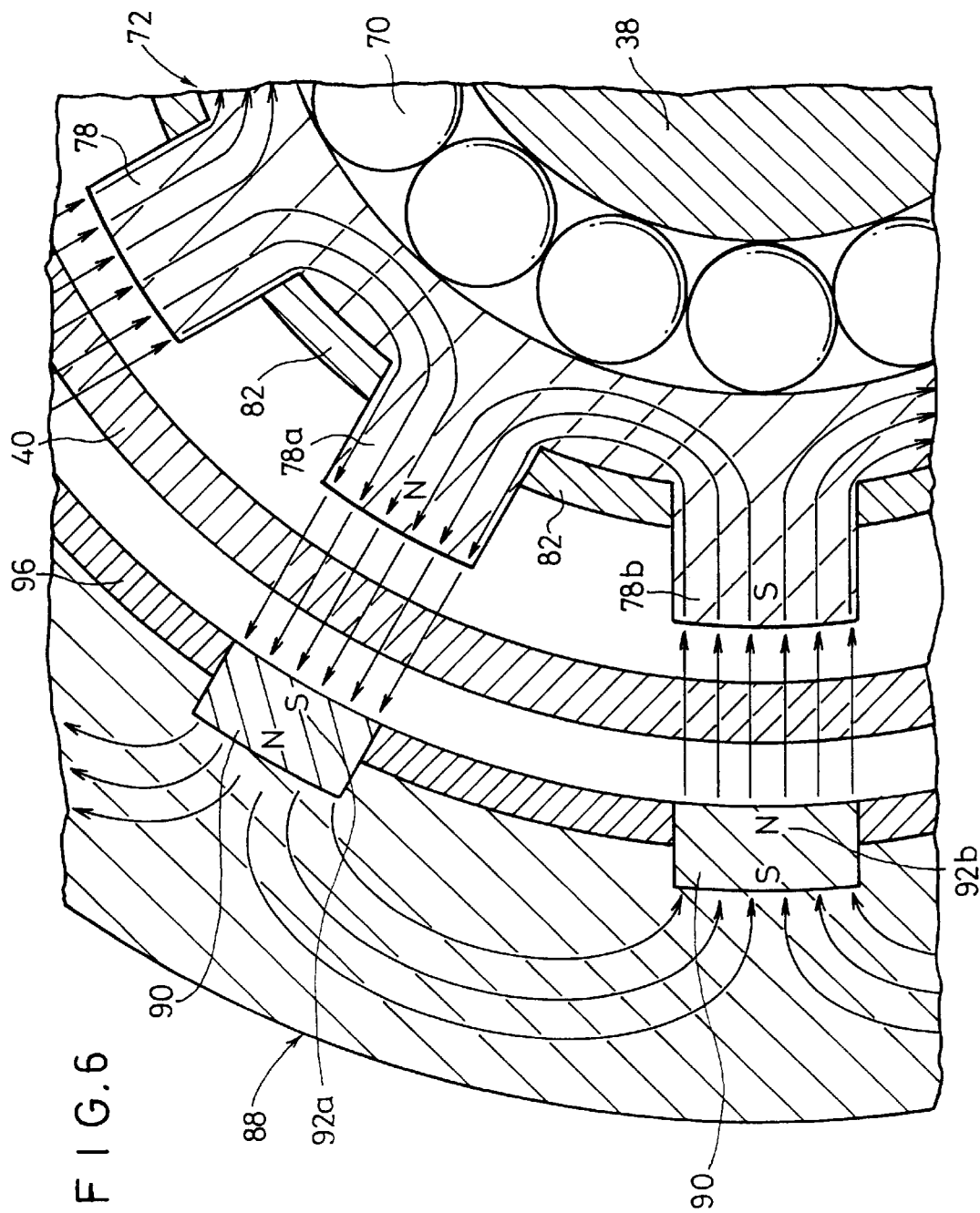
FIG. 6 schematically shows magnetic fluxes generated by the displacement member and the slider shown in FIG. 5.

A slider 88 for constructing the displacement mechanism 42 is provided displaceably in the axial direction of the tube 40 around the outer circumference of the tube 40 (see FIG. 1). As shown in FIGS. 4 and 5, a plurality of magnets 90, each of which is formed of a magnetic material such as neodymium and iron or a resin containing a magnetic component to have a lengthy size, are secured to the inner circumference of the slider 88 while being separated from each other by predetermined spacing distances in the circumferential direction. A plurality of magnets 91, each of which is formed to have a ring-shaped configuration, are secured to the inner circumference of the slider 88 while being separated from each other in the axial direction. The respective magnets 90, 91 are formed as driven-side axial magnetic patterns (magnetic poles) 92 and driven-side circumferential magnetic patterns (magnetic poles) 94 corresponding to the driving-side axial magnetic patterns 78 and the driving-side circumferential magnetic patterns 80 of the displacement member 72 respectively. The north poles and the south poles are alternately arranged for the magnets 90, 91 which construct the driven-side axial magnetic patterns 92 and the driven-side circumferential magnetic patterns 94 respectively. As shown in FIGS. 5 and 6, magnetic shieldings 96, which are formed of a non-magnetic component such as aluminum and copper, are fitted to gaps between the adjacent driven-side axial magnetic patterns 92 on the inner circumference of the slider 88. Magnetic shieldings 98 are also fitted to gaps between the adjacent driven-side circumferential magnetic patterns 94 (see FIG. 4).

As shown in FIGS. 1 and 2, a guide block 100 is secured to a lower portion of the slider 88. The guide block 100 is slidably engaged with the rail member 102. Accordingly, a guide mechanism 104 is constructed by the guide block 100 and the rail member 102. The guide mechanism 104 prevents the slider 88 from rotation. A plate-shaped table 106 is secured to an upper portion of the slider 88. The table 106 protrudes to the outside through the top of the casing 32. A workpiece 108, which is transported by the actuator 30, is placed on the table 106.

Figure 7:
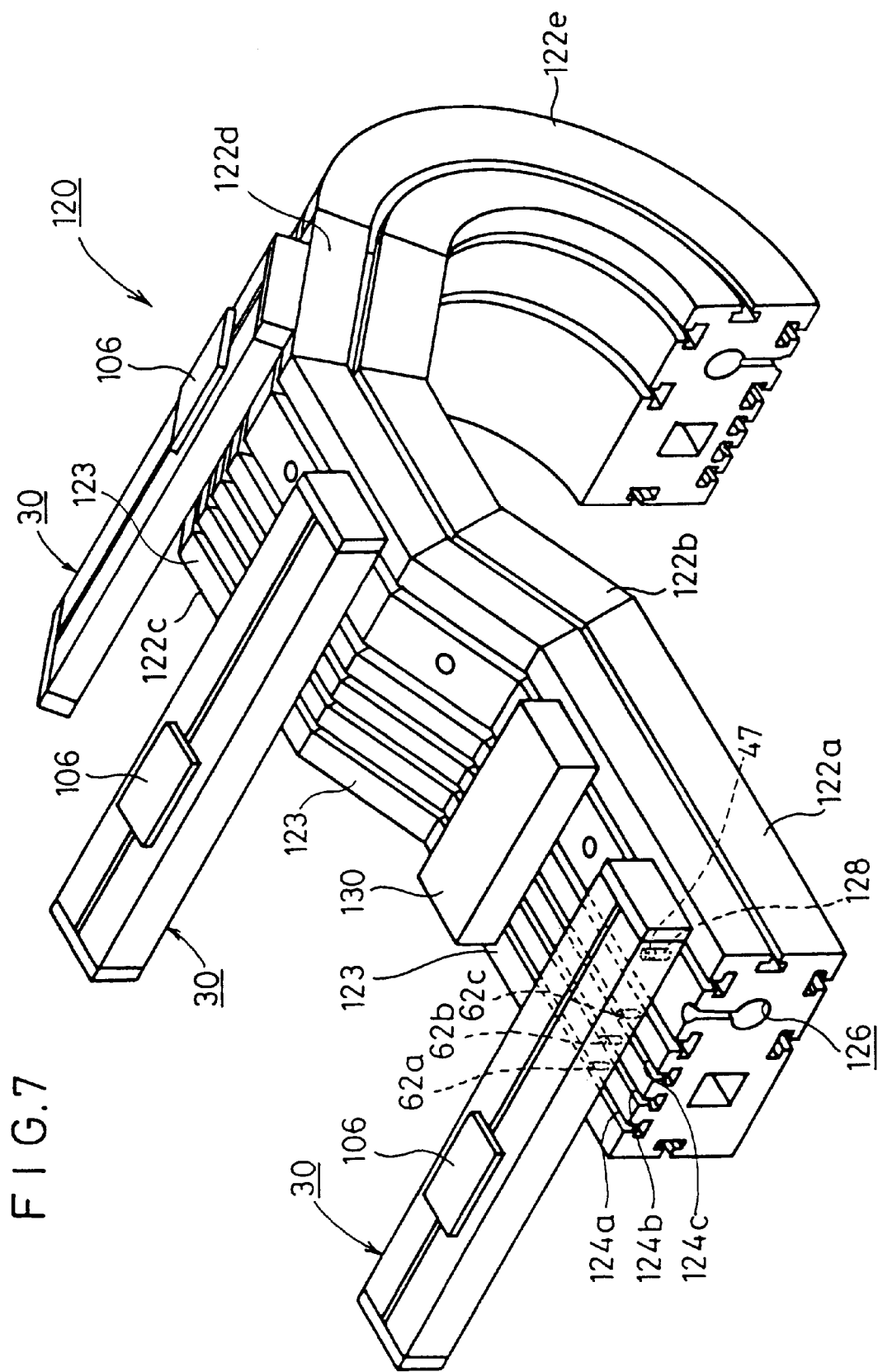
FIG. 7 shows a schematic perspective view illustrating a transport mechanism on which the actuator shown in FIG. 1 is used.

As shown in FIG. 7, the actuator 30 is used by being attached to a transport mechanism 120. The transport mechanism 120 comprises a plurality of frames 122a to 122e which are combined with each other. Buses 124a to 124c, to which the connectors 62a to 62c of the actuators 30 are connected, are provided on attachment surfaces 123 of the respective frames 122a to 122e. An exhaust passage 126, which is connected to an unillustrated vacuum suction source, is defined at the inside of the frames 122a to 122e.

A joint 128, which communicates with the exhaust passage 126, is provided on the attachment surface 123 of each of the frames 122a to 122e.

The actuator 30 is attached to the attachment surface 123 of any of the frames 122a to 122e. Upon attachment, the connectors 62a to 62c are connected to the buses 124a to 124c, and the joint 47 is connected to the joint 128. Accordingly, when the vacuum suction source is operated, the air at the inside of the casing 32 of the actuator 30 is drawn through the exhaust passage 126. Thus, the actuator 30 is prevented from scattering of dust or the like from the inside of the casing 32 to the outside of the actuator 30. Reference numeral 130 indicates a control box which contains solenoid-operated valves and sensor matrixes.

The actuator 30 according to the first embodiment is basically constructed as described above. Next, its operation will be explained.

When a driving signal is sent from an unillustrated control unit via the bus 124b of the transport mechanism 120 and the connector 62b to the AC servomotor 34 of the actuator 30, then the rotary shaft 52 of the AC servomotor 34 is rotated, and the ball screw 38 is rotated (see FIG. 1). Accordingly, the displacement member 72 tends to make rotation as well in accordance with the rotation of the ball screw 38. However, as shown in FIG. 6, the north pole is generated on the surface of the driving-side axial magnetic pattern 78a which is opposed to the driven-side axial magnetic pattern 92a of the south pole provided on the slider 88. Further, the south pole is generated on the surface of the driving-side axial magnetic pattern 78b which is opposed to the adjacent driven-side axial magnetic pattern 92b of the north pole. Therefore, the driving-side axial magnetic pattern 78a is attracted by the opposing driven-side axial magnetic pattern 92a, and it is repelled by the driven-side axial magnetic patterns 92b adjacent thereto. The driving-side axial magnetic pattern 78b is attracted by the opposing driven-side axial magnetic pattern 92b, and it is repelled by the driven-side axial magnetic patterns 92a adjacent thereto. As a result, the driving-side axial magnetic pattern 78a is prevented from displacement to the position opposing to the driven-side axial magnetic pattern 92b. Further, the slider 88 is also prevented from rotation by the aid of the guide mechanism 104. Consequently, the displacement member 72 is prevented from rotation (see FIGS. 5 and 6). Accordingly, the displacement member 72 converts the rotary motion of the ball screw 38 into the rectilinear motion, and thus it is displaced along the longitudinal direction of the actuator 30.

When the displacement member 72 is displaced, the driving-side circumferential magnetic patterns 80 are attracted by the magnets 91 which construct the opposing driven-side circumferential magnetic patterns 94, and they are repelled by the driven-side circumferential magnetic patterns 94 adjacent thereto (see FIG. 4). Therefore, the slider 88 is displaced along the tube 40 in accordance with the displacement of the displacement member 72. Accordingly, the workpiece 108, which is placed on the table 106, is transported in accordance with the displacement action of the slider 88.

As described above, in the actuator 30 according to the first embodiment, the magnetic poles having different polarities are alternately formed in the circumferential direction by the driving-side axial magnetic patterns 78 and the driven-side axial magnetic patterns 92 which are provided on the displacement member 72 and the slider 88 respectively. Accordingly, even when the displacement member 72 and the slider 88 are separated from each other, the displacement member 72 is prevented from rotation which would be otherwise caused by the rotation of the ball screw 38. The rotary motion of the ball screw 38 is converted by the displacement member 72 into the rectilinear motion. The rectilinear motion is transmitted to the slider 88 by the aid of the mutual attraction between the driving-side circumferential magnetic patterns 80 and the driven-side circumferential magnetic patterns 94. Therefore, the ball screw 38 can be surrounded by the tube 40. The working environment, in which the actuator 30 is used, is prevented from scattering of lubricating oil, dust or the like originating from the ball screw 38. The fear of pollution of the working environment is decreased. Further, the ball screw 38 is prevented from adhesion of dust or the like originating from the working environment.

In the first embodiment, the driven-side axial magnetic patterns 92 and the driven-side circumferential magnetic patterns 94 on the slider 88 are formed with the magnets 90, 91, and the driving-side axial magnetic patterns 78 and the driving-side circumferential magnetic patterns 80 on the displacement member 78 are formed of the magnetic material attracted by the magnets 90, 91. Alternatively, the driving-side axial magnetic patterns 78 and the driving-side circumferential magnetic patterns 80 on the displacement member 72 may be formed with magnets, and the driven-side axial magnetic patterns 92 and the driven-side circumferential magnetic patterns 94 on the slider 88 may be formed of a magnetic material. Further alternatively, all of the driving-side axial magnetic patterns 78 and the driving-side circumferential magnetic patterns 80 on the displacement member 72 and the driven-side axial magnetic patterns 92 and the driven-side circumferential magnetic patterns 94 on the slider 88 may be formed with magnets. The magnets described above may be electromagnets.

The ball screw 38, the ball members 70, the displacement member 72, the guide block 100, and the rail member 102 may be formed of aluminum or aluminum alloy, a hardened layer may be formed on the sliding section of each of them by means of, for example, shot peening, and an Alumite (anodic oxide coating) layer may be formed thereon. By doing so, the surface of the sliding section is smooth, the abrasion resistance is improved, and the actuator 30 successfully has a light weight. When a plurality of depressions are formed on the surface of the sliding section in order to effect the elastohydrodynamic lubrication, then the sliding section is appropriately lubricated, and the durability thereof is further improved.

The ball screw 38, the ball members 70, the displacement member 72, the guide block 100, and the rail member 102 may be formed of ultrahigh molecular weight polyethylene or polyimide.

Figure 8:
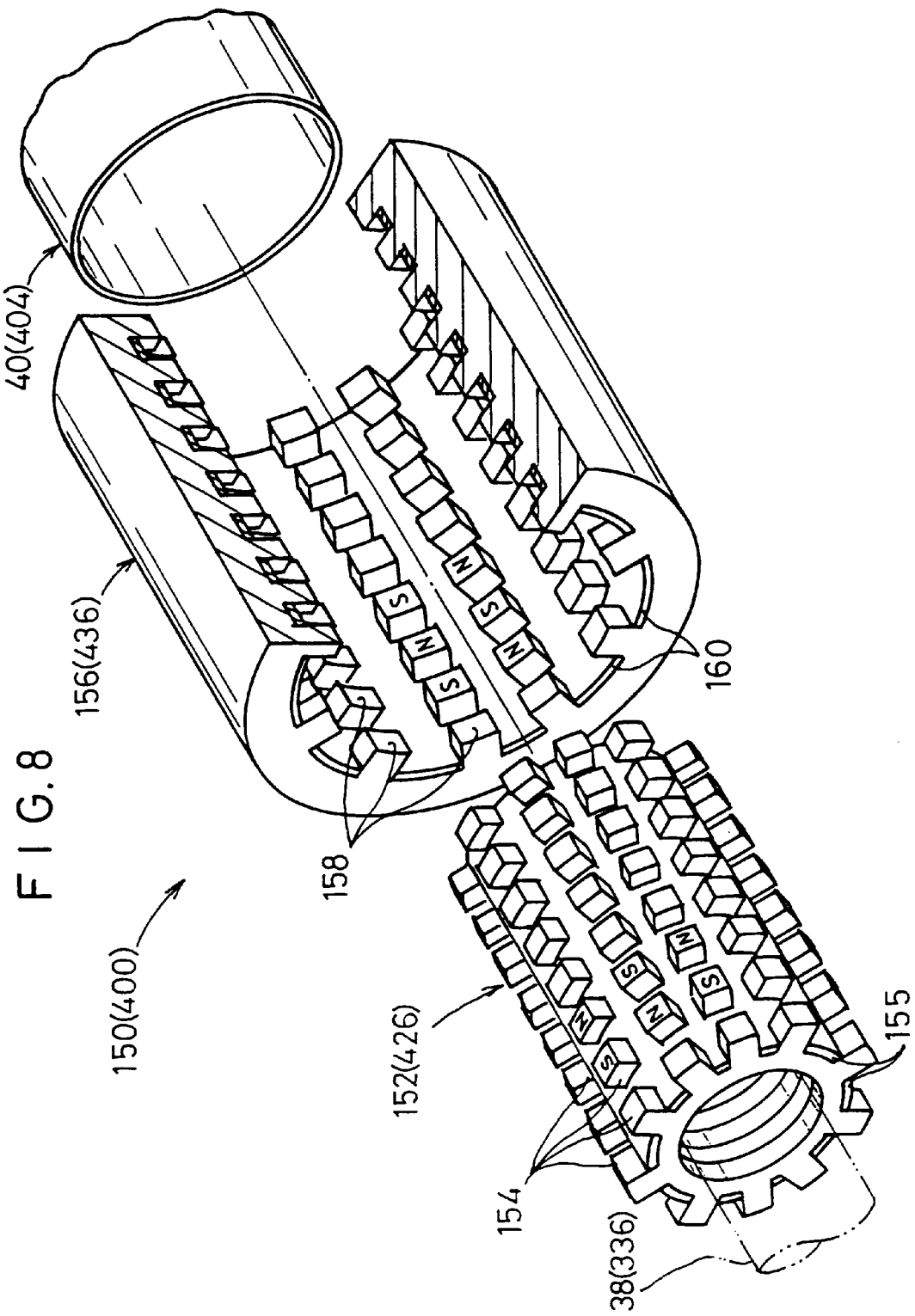
FIG. 8 shows, with partial cross section, a perspective view illustrating a displacement member and a slider of an actuator according to a second embodiment of the present invention.

Next, an actuator 150 according to a second embodiment will be explained with reference to FIG. 8. The same constitutive components as those of the actuator 30 according to the first embodiment are designated by the same reference numerals, detailed explanation of which will be omitted. In the following description, other embodiments will be explained in the same manner as described above.

A ball screw 38 of the actuator 150 is inserted through a displacement member 152. A plurality of driving-side magnetic patterns (magnetic poles) 154 are formed to protrude on the entire outer circumferential region of the displacement member 152. The respective driving-side magnetic patterns 154 are arranged and separated from each other by predetermined spacing distances in the axial direction and in the circumferential direction of the displacement member 152. The driving-side magnetic patterns 154 are arranged such that the north poles and the south poles are adjacent to one another. Magnetic shieldings 155, each of which is formed of a non-magnetic component, are provided between the respective driving-side magnetic patterns 154. The displacement member 152 is arranged at the inside of a tube 40.

On the other hand, a plurality of driven-side magnetic patterns (magnetic poles) 158, which correspond to the driving-side magnetic patterns 154, are formed to protrude on a slider 156. The respective driven-side magnetic patterns 158 are arranged and separated from each other by predetermined spacing distances in the axial direction and in the circumferential direction. The driven-side magnetic patterns 158 are arranged such that the north poles and the south poles are adjacent to one another. Magnetic shieldings 160, each of which is formed of a non-magnetic component, are provided between the respective driven-side magnetic patterns 158.

For example, the following methods are available to form the driving-side magnetic patterns 154 and the driven-side magnetic patterns 158. That is, magnets are secured to the displacement member 152 and the slider 156 to form the patterns. Alternatively, the displacement member 152 and the slider 156 are formed of a magnetic material, and the respective magnetic patterns 154, 158 are formed by means of magnetization.

When the rotary motion of the ball screw 38 is transmitted to the displacement member 152, the displacement member 152 tends to be made to rotate. However, the driving-side magnetic patterns 154 are attracted by the opposing driven-side magnetic patterns 158, and the driving-side magnetic patterns 154 are repelled by the circumferentially adjoining driven-side magnetic patterns 158 of the opposing driven-side magnetic patterns 158 so that the rotation is not caused. Accordingly, the displacement member 152 is prevented from rotation in the circumferential direction. Therefore, the displacement member 152 is displaced only in the axial direction.

When the displacement member 152 is displaced in the axial direction, the driving-side magnetic patterns 154 arranged in the axial direction are attracted by the opposing driven-side magnetic patterns 158, and they are repelled by the driven-side magnetic patterns 158 adjacent thereto. Thus, the slider 156 is displaced in the axial direction in accordance with the displacement action of the displacement member 152. The slider 156 undergoes displacement as described above.

In the actuator 150 according to the second embodiment, the driving-side magnetic patterns 154 and the driven-side magnetic patterns 158, which are provided on the displacement member 152 and the slider 156 respectively, are used to alternately form the magnetic poles having the different polarities in the circumferential direction and in the axial direction. Accordingly, even when the displacement member 152 and the slider 156 are separated from each other, the displacement member 152 is prevented from rotation which would be otherwise caused by the rotation of the ball screw 38. The rotary motion of the ball screw 38 is converted into the rectilinear motion. The rectilinear motion is transmitted to the slider 156. Therefore, the ball screw 38 can be surrounded by the tube 40. The working environment, in which the actuator 30 is used, is prevented from scattering lubricating oil, dust or the like originating from the ball screw 38.

Next, an actuator 170 according to a third embodiment will be explained with reference to FIG. 9.

A plurality of driving-side magnetic patterns (magnetic poles) 174 are formed to protrude on the outer circumference of a displacement member 172 of the actuator 170. The respective driving-side magnetic patterns 174 are arranged and separated from each other by predetermined spacing distances in the axial direction and in a direction inclined with respect to the axial direction. That is, the respective driving-side magnetic patterns 174 are arranged while being aligned in a spiral configuration along the axis. The north poles and the south poles are alternately arranged for the driving-side magnetic patterns 174. A magnetic shielding 175 formed of a non-magnetic component is provided between the respective driving-side magnetic patterns 174. On the other hand, a plurality of driven-side magnetic patterns (magnetic poles) 178 corresponding to the driving-side magnetic patterns 174 are formed to protrude on a slider 176. The respective driven-side magnetic patterns 178 are arranged and separated from each other by predetermined spacing distances in the axial direction and in the direction inclined with respect to the axial direction. The north poles and the south poles are alternately arranged for the driven-side magnetic patterns 178. A magnetic shielding 179 formed of a non-magnetic component is provided between the respective driven-side magnetic patterns 178.

In the third embodiment constructed as described above, the driving-side magnetic patterns 174 attract the opposing driven-side magnetic patterns 178 in the same manner as in the first embodiment. On the other hand, the driving-side magnetic patterns 174 repel the driven-side magnetic patterns 178 adjacent to the opposing driven-side magnetic patterns 178. Therefore, the displacement member 172 is prevented from rotation which would be otherwise caused by the rotation of the ball screw 38. When the displacement member 172 is displaced in the axial direction, the slider 176 is displaced only in the axial direction in accordance with the displacement of the displacement member 172.

In the actuator 170, even when the displacement member 172 and the slider 176 are separated from each other, then the rotary motion of the ball screw 38 can be converted into the rectilinear motion by the aid the displacement member 172, and the rectilinear motion can be transmitted to the slider 176, in the same manner as in the actuators 30, 150 according to the first and second embodiments. Therefore, the ball screw 38 can be surrounded by the tube 40. The working environment, in which the actuator 170 is used, is prevented from scattering of lubricating oil, dust or the like originating from the ball screw 38.

Next, an actuator 180 according to a fourth embodiment will be explained with reference to FIG. 10.

A plurality of driving-side magnetic patterns (magnetic poles) 184, which extend in a helical configuration, are formed to protrude on a displacement member 182 of the actuator 180. On the other hand, a plurality of driven-side magnetic patterns (magnetic poles) 188 corresponding to the driving-side magnetic patterns 184, which extend in a helical configuration, are formed to protrude on a slider 186. The north poles and the south poles are alternately arranged for the adjacent driving-side magnetic patterns 184 and for the adjacent driven-side magnetic patterns 188. Magnetic shieldings 190, 192 formed of a non-magnetic component are provided in gaps between the respective driving-side magnetic patterns 184 and between the respective driven-side magnetic patterns 188.

In the fourth embodiment constructed as described above, the adjacent driving-side magnetic patterns 184 are also separated from each other by predetermined spacing distances in the circumferential direction and in the axial direction. On the other hand, the driven-side magnetic patterns 188 are also separated from each other by predetermined spacing distances in the circumferential direction and in the axial direction. Accordingly, the driving-side magnetic patterns 184 attract the opposing driven-side magnetic patterns 188 in the same manner as in the first to third embodiments. On the other hand, the driving-side magnetic patterns 184 repel the driven-side magnetic patterns 188 adjacent to the opposing driven-side magnetic patterns 188. Therefore, the displacement member 182 is prevented from rotation which would be otherwise caused by the rotation of the ball screw 38. When the displacement member 182 is displaced in the axial direction, the slider 186 is displaced only in the axial direction in accordance with the displacement of the displacement member 182.

As described above, even when the displacement member 182 and the slider 186 are separated from each other, then the rotary motion of the ball screw 38 can be converted into the rectilinear motion by the aid of the displacement member 182, and the rectilinear motion can be transmitted to the slider 186. Therefore, the ball screw 38 can be surrounded by the tube 40. The working environment, in which the actuator 180 is used, is prevented from scattering lubricating oil, dust or the like originating from the ball screw 38.

Next, an actuator 200 according to a fifth embodiment will be explained with reference to FIG. 11.

The actuator 200 comprises a casing 202 which has a lengthy size, an AC servomotor (rotary driving source) 204 which is provided on one end side of the casing 202, a ball screw (feed screw) 206 which is rotated by the AC servomotor 204, a tube 208 which surrounds the ball screw 206, and a displacement mechanism 210 which is displaceable by the aid of the ball screw 206.

Figure 12:
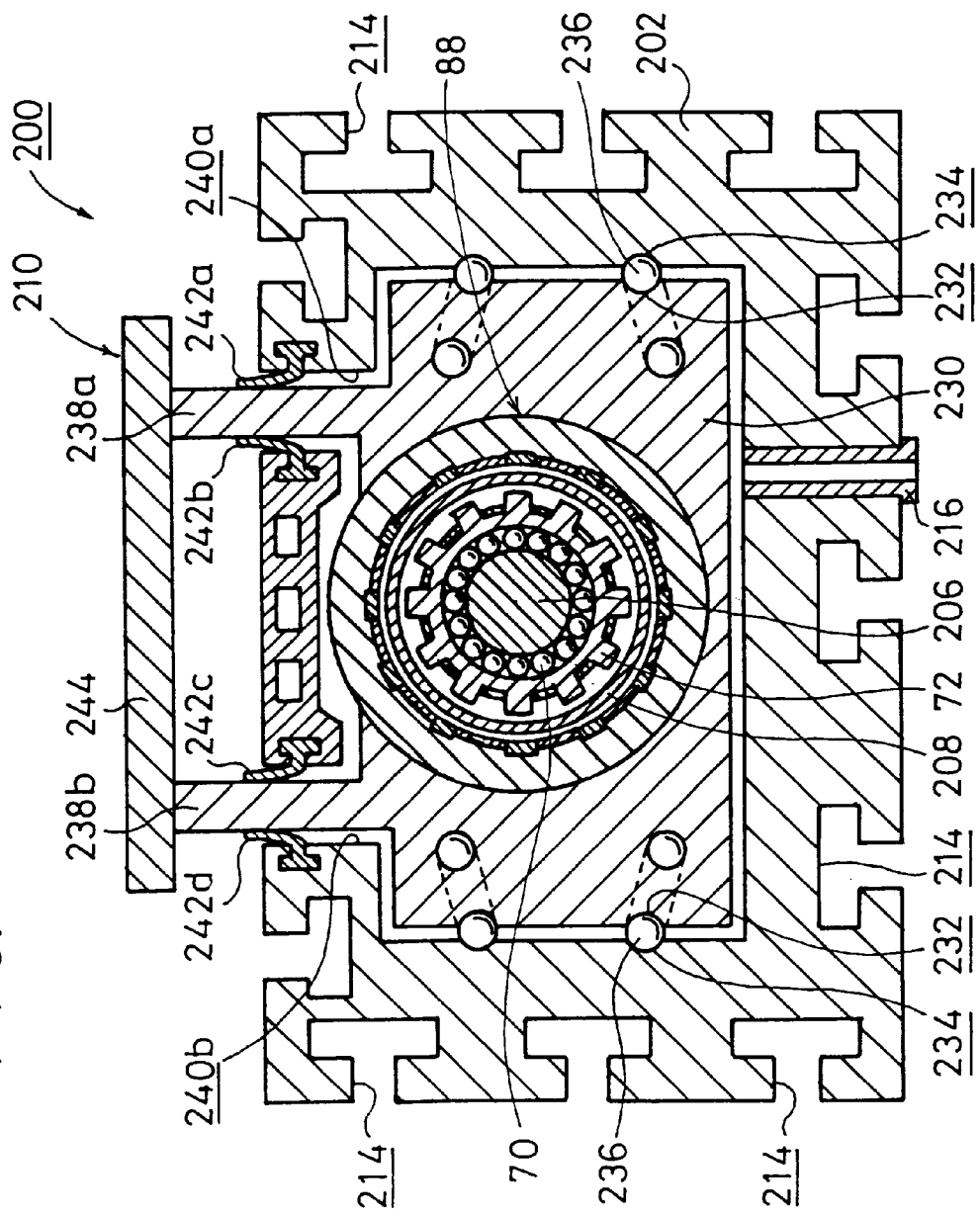
FIG. 12 shows a sectional view taken along a line XII—XII illustrating the actuator shown in FIG. 11.

As shown in FIG. 12, a plurality of substantially T-shaped grooves 214 for coupling the actuator 200 to another apparatus or the like are defined on outer walls of the casing 202. A joint 216 is provided through the bottom of the casing 202. The inside of the casing 202 communicates with the outside via the joint 216.

Figure 13:
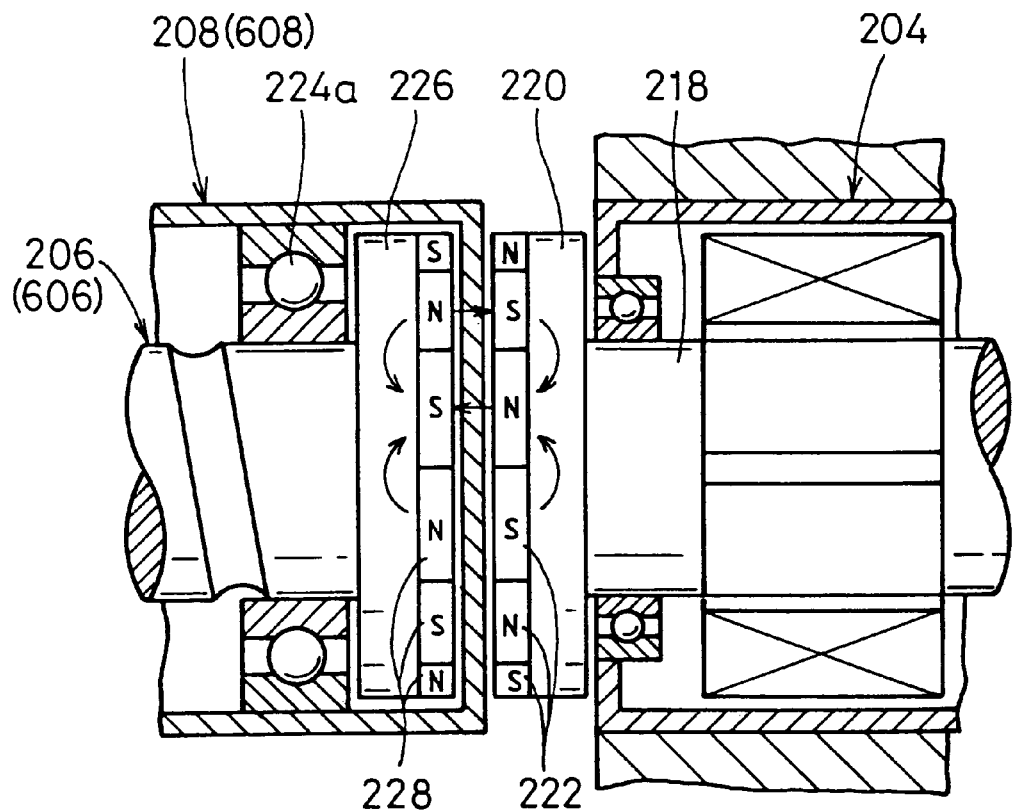
FIG. 13 shows a partial magnified schematic longitudinal sectional view illustrating disk members of the actuator shown in FIG. 11.
Figure 14:
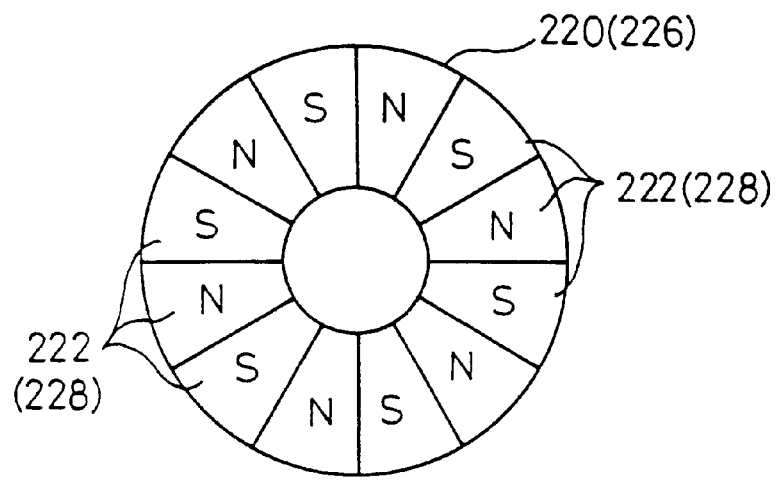
FIG. 14 shows a schematic front view illustrating the disk member shown in FIG. 13.

As shown in FIG. 13, a disk member 220, which is disposed in the vicinity of an end of the tube 208, is formed at one end of a rotary shaft 218 of the AC servomotor 204. A plurality of magnets 222 for constructing a first magnetic pole section are secured to the disk member 220. As shown in FIG. 14, the magnets 222 include the north poles and the south poles which are alternately arranged in the circumferential direction.

Both end sides of the tube 208 are closed. The ball screw 206, which is provided at the inside of the tube 208, is isolated from the outside (see FIG. 11). The ball screw 206 is rotatably supported by bearings 224a to 224c. A disk member 226, which is opposed to the disk member 220 of the AC servomotor 204, is formed at an end of the ball screw 206. A plurality of magnets 228 for constructing a second magnetic pole section are secured to the disk member 226. The magnets 228 include the north poles and the south poles which are alternately arranged in the circumferential direction (see FIG. 14).

A displacement member 72 is engaged via a plurality of ball members 70 to the ball screw 206 in the same manner as in the actuator 30 according to the first embodiment. A slider 88 for constructing a displacement mechanism 210 is slidably provided on the outer circumference of the tube 208. A guide block 230 is secured to the slider 88. As shown in FIG. 12, a plurality of ball grooves 232, 234 are formed on mutually opposing surfaces of the guide block 230 and the casing 202. A plurality of ball members 236 are rollably engaged with the ball grooves 232, 234. Accordingly, the guide block 230 is displaceably supported by the casing 202 via the ball members 236.

Figure 15:
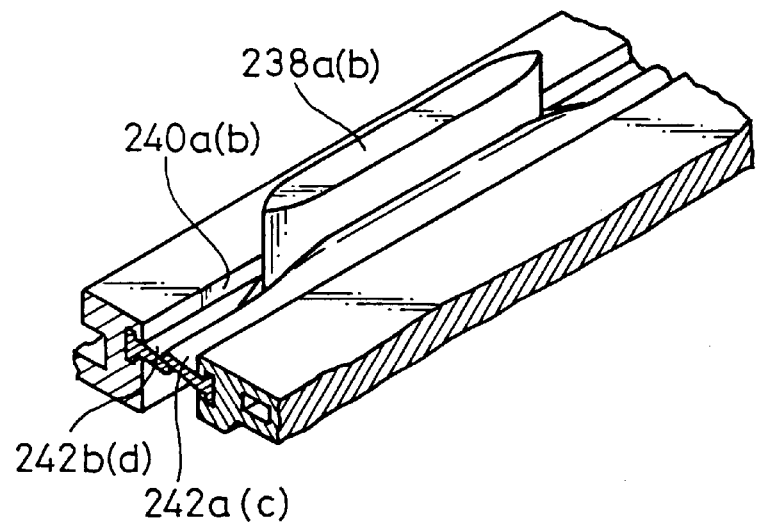
FIG. 15 shows a partial magnified schematic perspective view illustrating a projection of the actuator shown in FIG. 11.

Lubricator members 237a, 237b, which abut against the outer circumference of the tube 208 and which are formed of a material such as a porous material, a fiber material, a nonwoven material, and a sponge material, are provided at ends of the slider 88. The lubricator members 237a, 237b contain lubricating oil. Projections 238a, 238b are formed at upper portions of the guide block 230 (see FIG. 12). The projections 238a, 238b protrude to the outside through slits 240a, 240b defined through the casing 202. As shown in FIG. 15, both ends of the projections 238a, 238b in the displacement direction are formed to have a wedge-shaped configuration. A pair of seal members 242a to 242d are provided on wall sections of each of the slits 240a, 240b. Edges of the seal members 242a to 242d abut against side walls of the projections 238a, 238b. Thus, the actuator 200 is prevented from invasion of dust or the like through the slits 240a, 240b thereinto, and the actuator 200 is prevented from scattering of dust or the like therefrom to the outside. A table 244 is secured to the projections 238a, 238b. The table 244 is formed so that an unillustrated workpiece may be placed thereon.

The actuator 200 according to the fifth embodiment is basically constructed as described above. Next, its operation will be explained.

An unillustrated vacuum suction source is connected to the joint 216 of the actuator 200. When the vacuum suction source is operated, the air at the inside of the actuator 200 is drawn by the vacuum suction source. Accordingly, the actuator 200 is prevented from scattering of dust or the like from the inside through the slits 240a, 240b to the outside.

Figure 11:
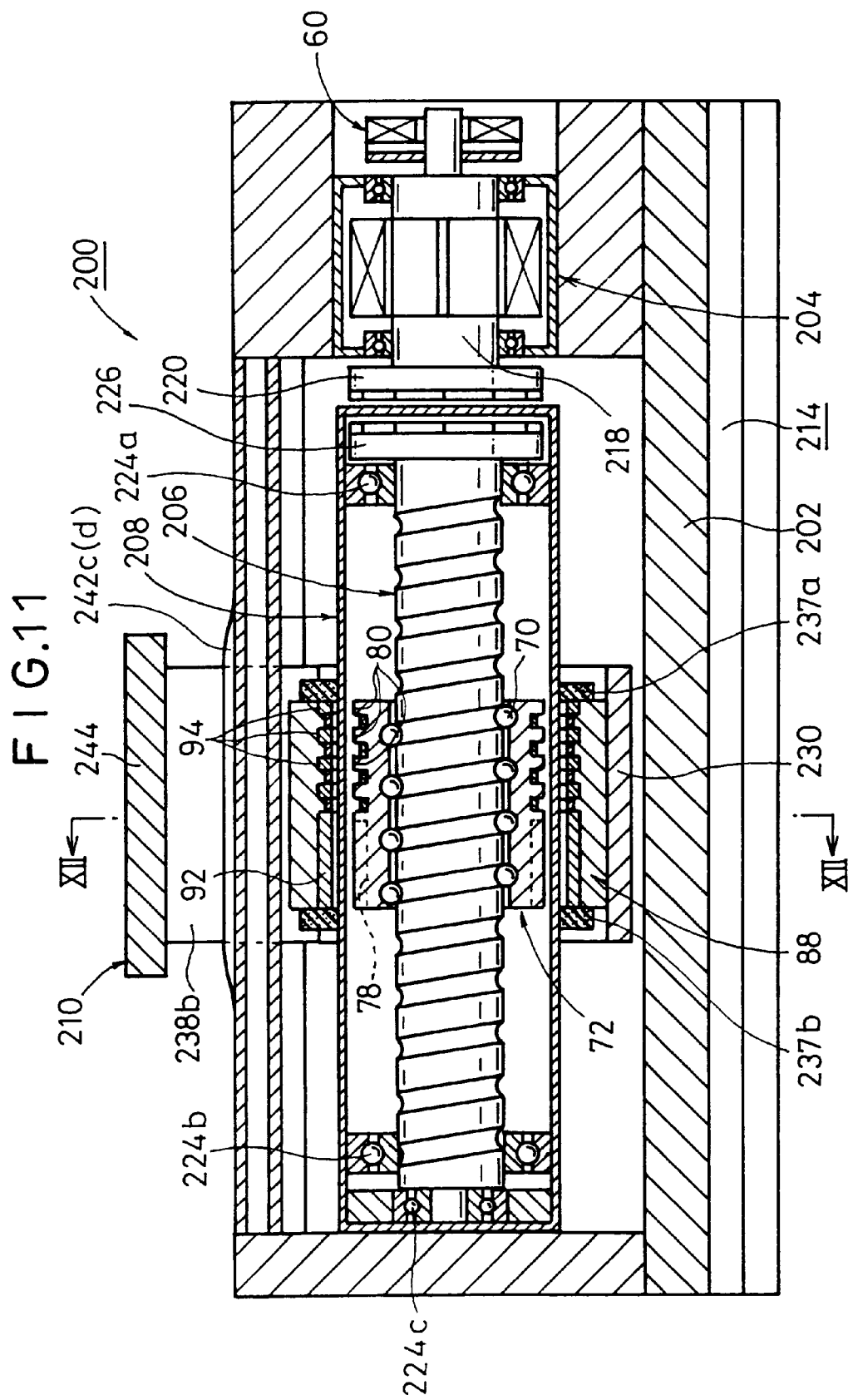
FIG. 11 shows a schematic longitudinal sectional view illustrating an actuator according to a fifth embodiment of the present invention.

When the AC servomotor 204 is operated, the disk member 220 is rotated together with the rotary shaft 218 (see FIG. 11). The rotary motion is transmitted to the ball screw 206 owing to the mutual attraction and the mutual repulsion between the magnets 222 on the disk member 220 and the magnets 228 secured to the disk member 226 of the ball screw 206 (see FIG. 13).

When the ball screw 206 is rotated, the displacement member 72 tends to make rotation together with the ball screw 206. However, the driving-side axial magnetic patterns 78 of the displacement member 72 make mutual magnetic attraction with respect to the driven-side axial magnetic patterns 92 of the opposing slider 88, and they make repulsion with respect to the driven-side axial magnetic patterns 92 adjacent thereto, in the same manner as in the first embodiment. Accordingly, the displacement member 72 converts the rotary motion of the ball screw 206 into the rectilinear motion, and it makes displacement only in the axial direction. The slider 88 is displaced in the axial direction in accordance with the displacement of the displacement member 72. Thus, the workpiece (not shown), which is placed on the table 244, is transported.

During this process, the lubricating oil is applied to the surface of the tube 208 by the aid of the lubricator members 237a, 237b. Accordingly, the slider 88 smoothly slides on the outer circumference of the tube 208. Further, the lubricator members 237a, 237b adsorb dust or the like adhered to the outer circumference of the tube 208. Therefore, it is possible to eliminate any fear of trouble on the operation or the slider 88 or other components, which would be otherwise caused by the dust or the like. Further, the lubricator members 237a, 237b function to adsorb excessive lubricating oil existing on the outer circumference of the tube 208.

In the fifth embodiment, the ball screw 206 is completely surrounded by the tube 208. Therefore, the actuator 200 is prevented from scattering of dust or the like from the ball screw 206 to the outside. Further, the ball screw 206 is prevented from adhesion of dust or the like as well. screw 336. A magnetic pole 360a as the north pole is formed on the peak of one of the male threads 358a, and a magnetic pole 360b as the south pole is formed on the peak of the other male thread 358b. Magnetic poles 362a, 362b as the north and south poles respectively are formed at valleys between the male thread 358a and the male thread 358b.

Figure 19:
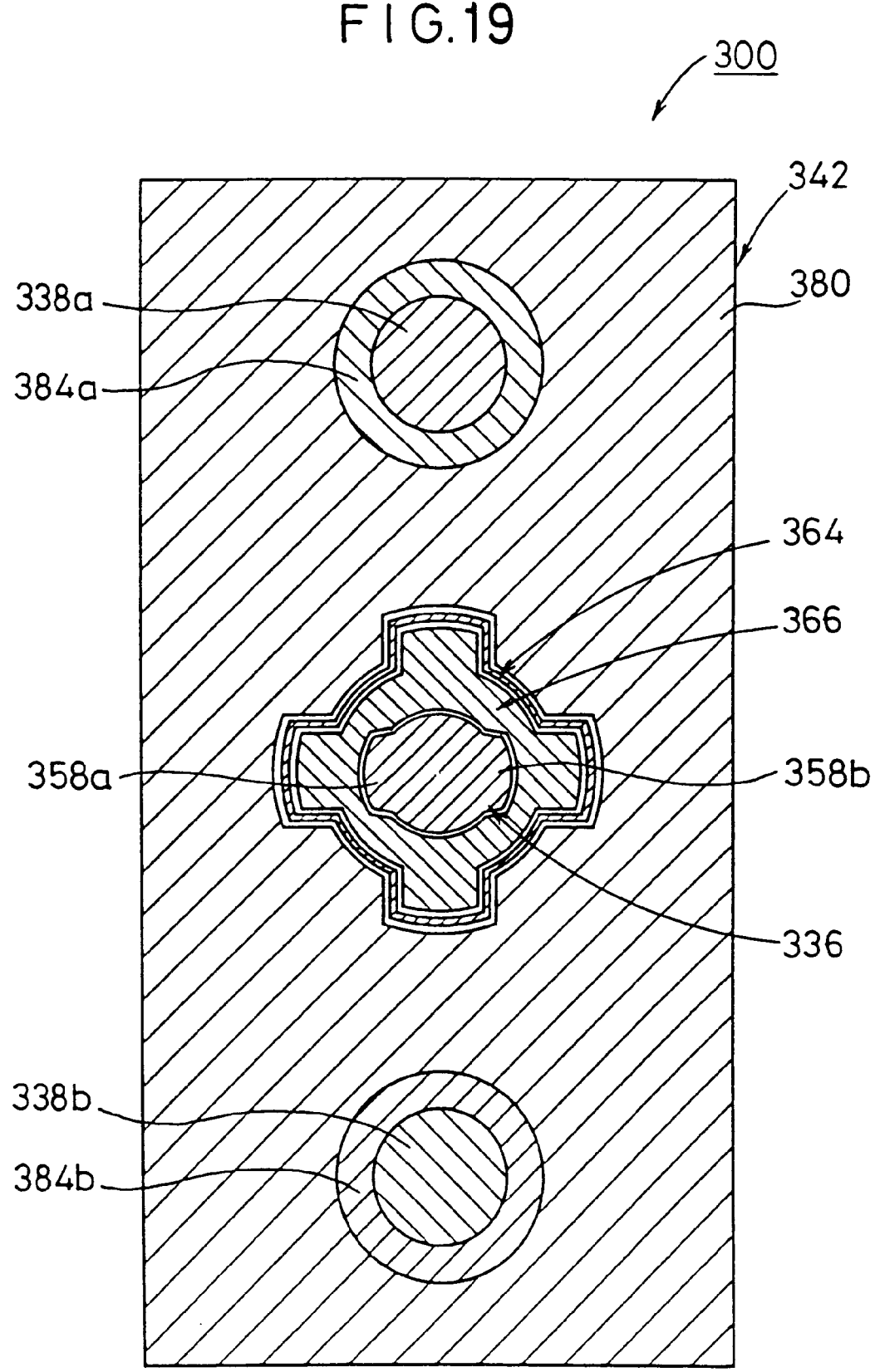
FIG. 19 shows a sectional view taken along a line XIX—XIX illustrating the actuator shown in FIG. 17.

The feed screw 336 is surrounded by a tube 364 which is formed to have a spline-shaped configuration (see FIG. 19). Both ends of the tube 364 are supported by a housing 346 for the AC servomotor 332 and the support member 340 (see FIG. 17). A displacement member 366, which constitutes the displacement mechanism 342 and which is engaged with the feed screw 336, is provided at the inside of the tube 364. The displacement member 366 is formed of a magnetic material such as neodymium and iron. The outer circumference of the displacement member 366 is formed to have a spline-shaped configuration along the inner wall of the tube 364 (see FIG. 19).

Figure 16:
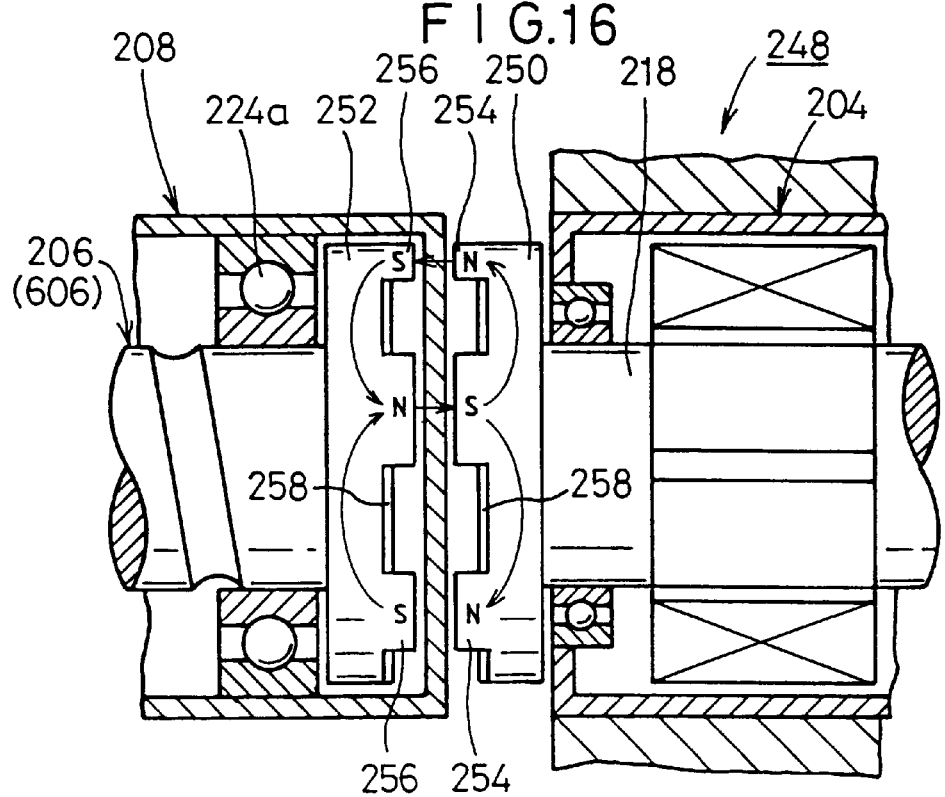
FIG. 16 shows a partial magnified schematic longitudinal sectional view illustrating disk members used for an actuator according to a sixth embodiment of the present invention.
Figure 18:
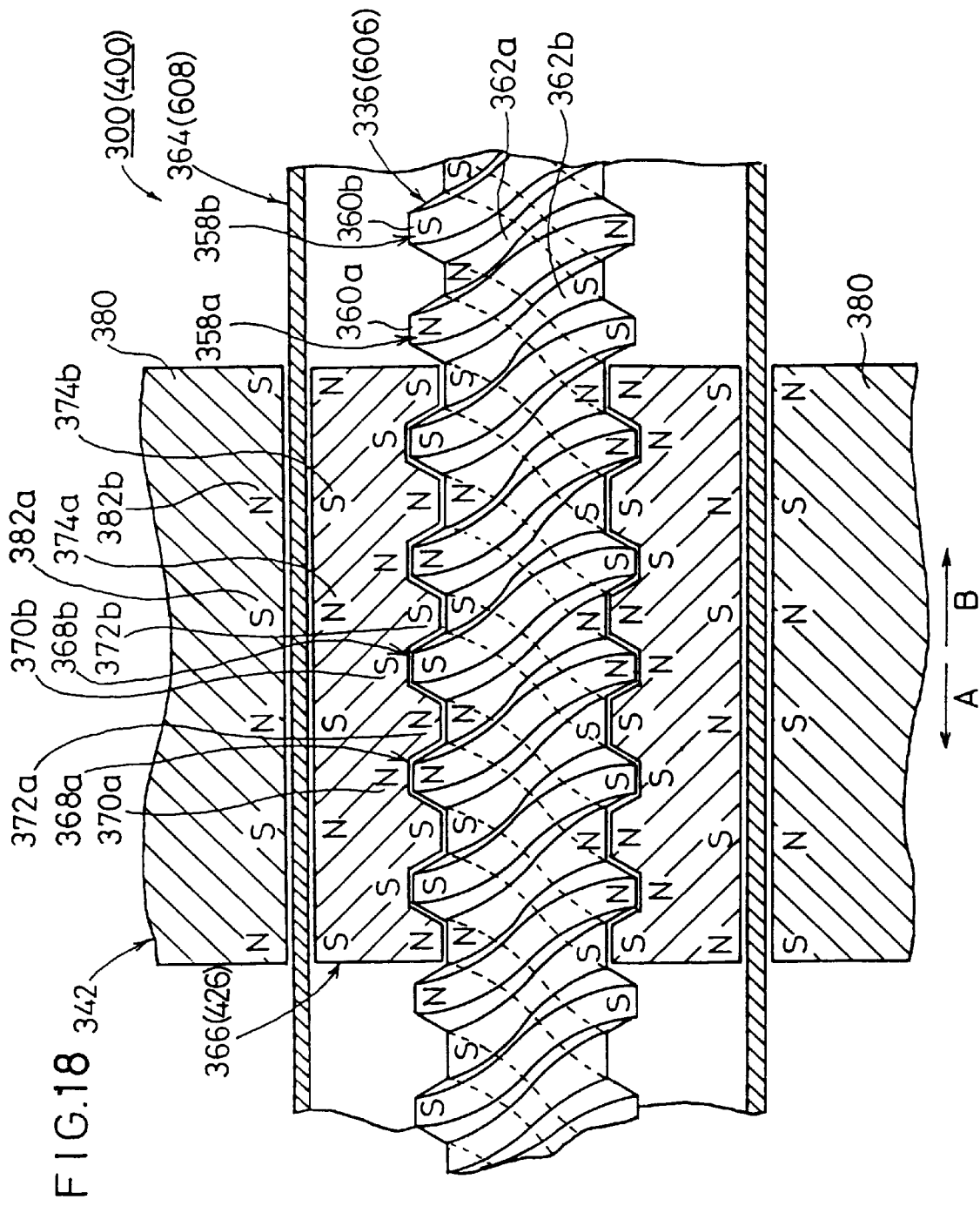
FIG. 18 shows a partial magnified longitudinal sectional view illustrating the actuator shown in FIG. 17.

As shown in FIG. 18, female threads 368a, 368b, which are meshed with the male threads 358a, 358b, are formed on the displacement member 366. A magnetic pole 370a as the north pole is formed at a valley of the female thread 368a opposing to the magnetic pole 360a as the north pole. On the other hand, a magnetic pole 370b as the south pole is formed at a valley of the female thread 368b opposing to the magnetic pole 360b as the south pole. A magnetic pole 372a as the north pole opposing to the magnetic pole 362a as the In the fifth embodiment, the plurality of magnets 222 are secured to the disk member 220 of the AC servomotor 204, while the plurality of magnets 228 are also secured to the disk member 226 of the ball screw 206. Alternatively, the following arrangement is available as in an actuator 248 according to a sixth embodiment shown in FIG. 16. That is, a plurality of mutually opposing projections 254, 256 are formed on surfaces of respective disk members 250, 252 of the AC servomotor 204 and the ball screw 206. The respective projections 254, 256 are alternately magnetized to give the north poles and the south poles. Further, magnetic shieldings 258 are provided therebetween.

Figure 17:
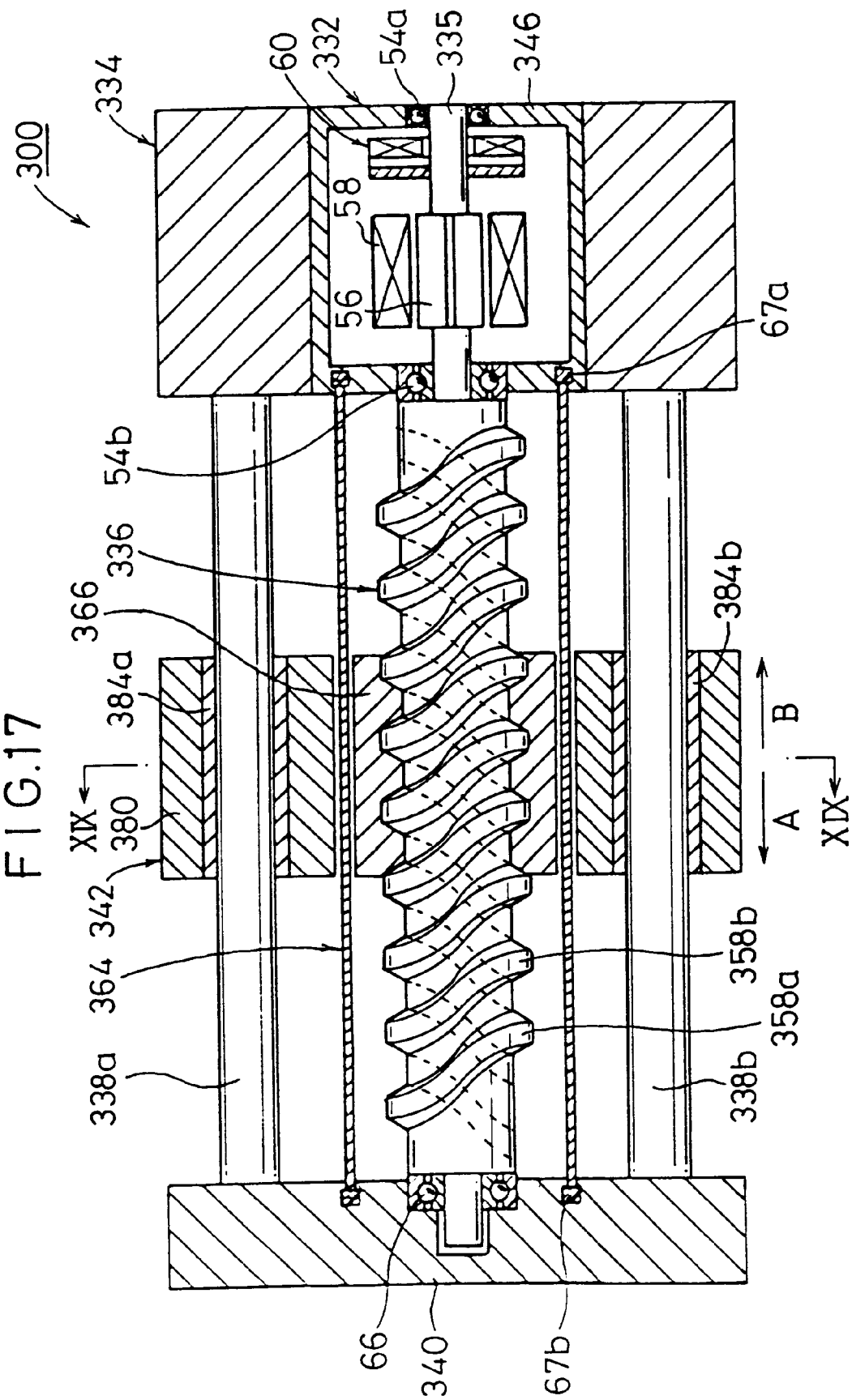
FIG. 17 shows a schematic longitudinal sectional view illustrating an actuator according to a seventh embodiment of the present invention.

Next, an actuator 300 according to a seventh embodiment will be explained with reference to FIG. 17.

The actuator 300 basically comprises a base member 334 which is arranged with an AC servomotor 332 as a rotary driving source, a feed screw 336 which is formed integrally with a rotary shaft 335 of the AC servomotor 332, guide shafts 338a, 338b which are provided in parallel to the feed screw 336, a support member 340 to which ends of the feed screw 336 and the guide shafts 338a, 338b are secured, and a displacement mechanism 342 which is displaceable along the longitudinal direction of the feed screw 336 and the guide shafts 338a, 338b.

The feed screw 336 is formed of a magnetic material such as neodymium and iron. As shown in FIG. 18, two strips of helical male threads 358a, 358b are formed on the feed north pole and a magnetic pole 372b as the south pole opposing to the magnetic pole 362b as the south pole are formed at the peaks between the female thread 368a and the female thread 368b. Accordingly, the magnetic poles 370a, 370b, 372a, 372b of the displacement member 366 repel the magnetic poles 360a, 360b, 362a, 362b of the feed screw 336. Thus, the displacement member 366 and the feed screw 336 are held in a non-contacting manner. Magnetic poles 374a, 374b as the north and south poles respectively are alternately formed by every predetermined spacing distance on the outer circumference of the displacement member 366.

A slider 380, which is disposed in the vicinity of the displacement member 366 and which constitutes the displacement mechanism 342, is provided at the outside of the tube 364. The inner circumference of the slider 380 is formed to have a spline-shaped configuration along the outer wall of the tube 364 (see FIG. 19). The slider 380 is formed of a magnetic material such as neodymium and iron. Magnetic poles 382a as the south poles, which are opposed to the magnetic poles 374a as the north poles, are formed on the inner circumference of the slider 380. Magnetic poles 382b as the north poles, which are opposed to the magnetic poles 374b as the south poles, are formed thereon. Therefore, the magnetic poles 374a, 374b mutually attract the magnetic poles 382a, 382b with the tube 364 intervening therebetween.

Bushes 384a, 384b are provided on the slider 380. The guide shafts 338a, 338b are inserted through the bushes 384a, 384b (see FIG. 17). Accordingly, the slider 380 is supported by the guide shafts 338a, 338b. The inner wall of the slider 380 is held while being slightly separated from the outer wall of the tube 364.

The actuator 300 according to the seventh embodiment is basically constructed as described above. Next, its operation will be explained.

When a driving signal is sent from an unillustrated control unit to the AC servomotor 332 of the actuator 300, the rotary shaft 335 is rotated together with the feed screw 336. The rotary motion is transmitted to the displacement member 366, and the displacement member 366 tends to make rotation together with the feed screw 336. However, the spline-shaped displacement member 366 is engaged with the tube 364, and thus it is prevented from rotation (see FIG. 19). Accordingly, the rotary motion of the feed screw 336 is converted into the rectilinear motion, and the motion is transmitted to the displacement member 366. Thus, the displacement member 366 is displaced in a direction indicated by the arrow A or B as shown in FIG. 18.

When the displacement member 366 is displaced, then the magnetic poles 374a, 374b of the displacement member 366 attract the magnetic poles 382a, 382b of the slider 380 via the tube 364, and the slider 380 is displaced in the direction of the arrow A or B in accordance with the displacement of the displacement member 366. Accordingly, an unillustrated workpiece is transported by the slider 380.

As shown in FIG. 18, the actuator 300 comprises the displacement member 366 having the magnetic poles 370a, 370b, 372a, 372b which repel the magnetic poles 360a, 360b, 362a, 362b of the feed screw 336. The displacement member 366 is held while making no contact with the feed screw 336, and there is no abrasion between the feed screw 336 and the displacement member 366. Accordingly, the actuator 300 requires no lubricating oil, and it brings about decrease in generation of noise and dust or the like. Therefore, the actuator 300 has a long service life, and it brings about decrease in operation such as those for maintenance as well. Further, the actuator 300 is prevented from scattering of dust or the like, because the feed screw 336 is surrounded by the tube 364.

Figure 20:
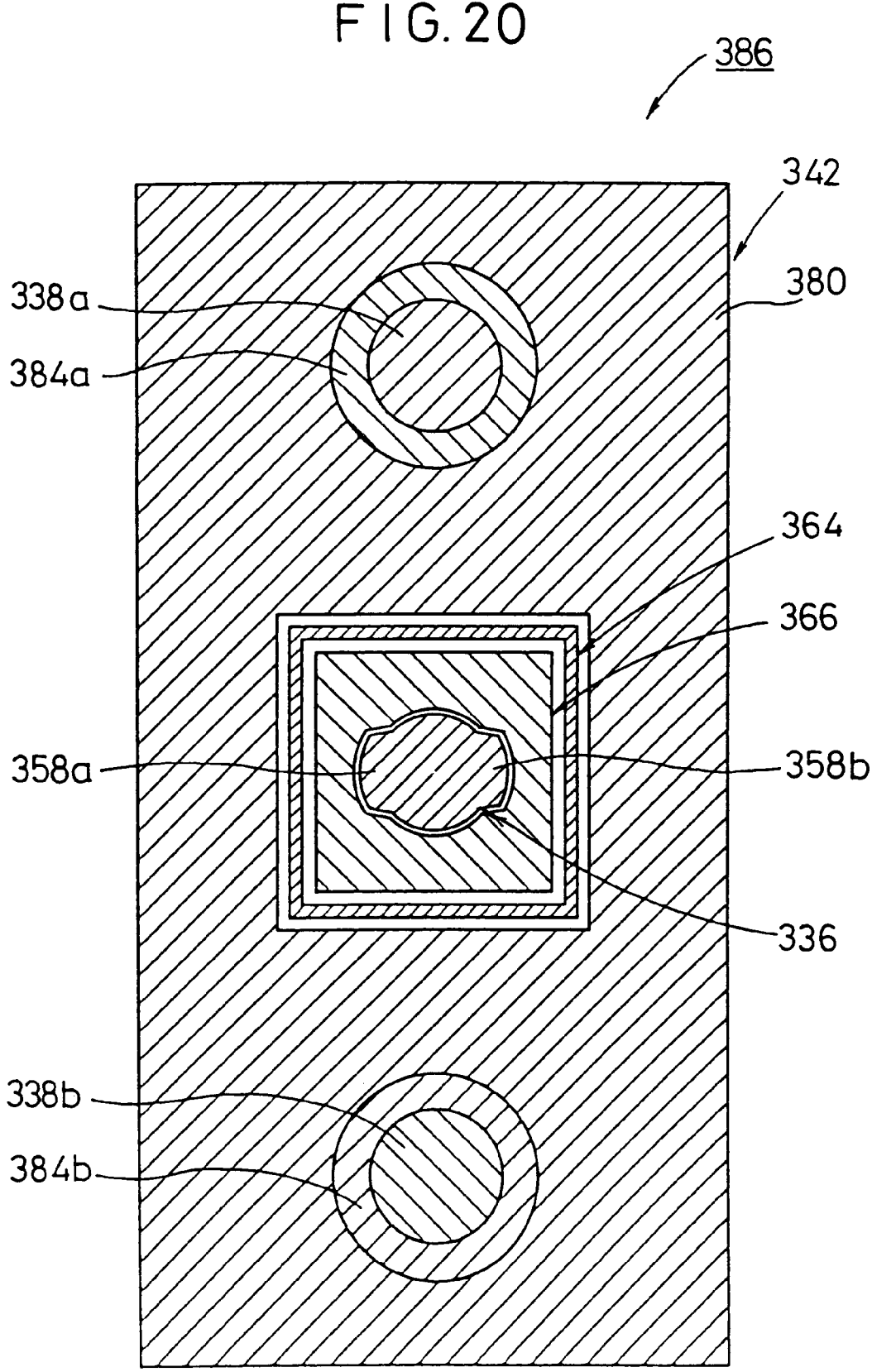
FIG. 20 shows a schematic longitudinal sectional view illustrating an actuator according to an eighth embodiment of the present invention.
Figure 21:
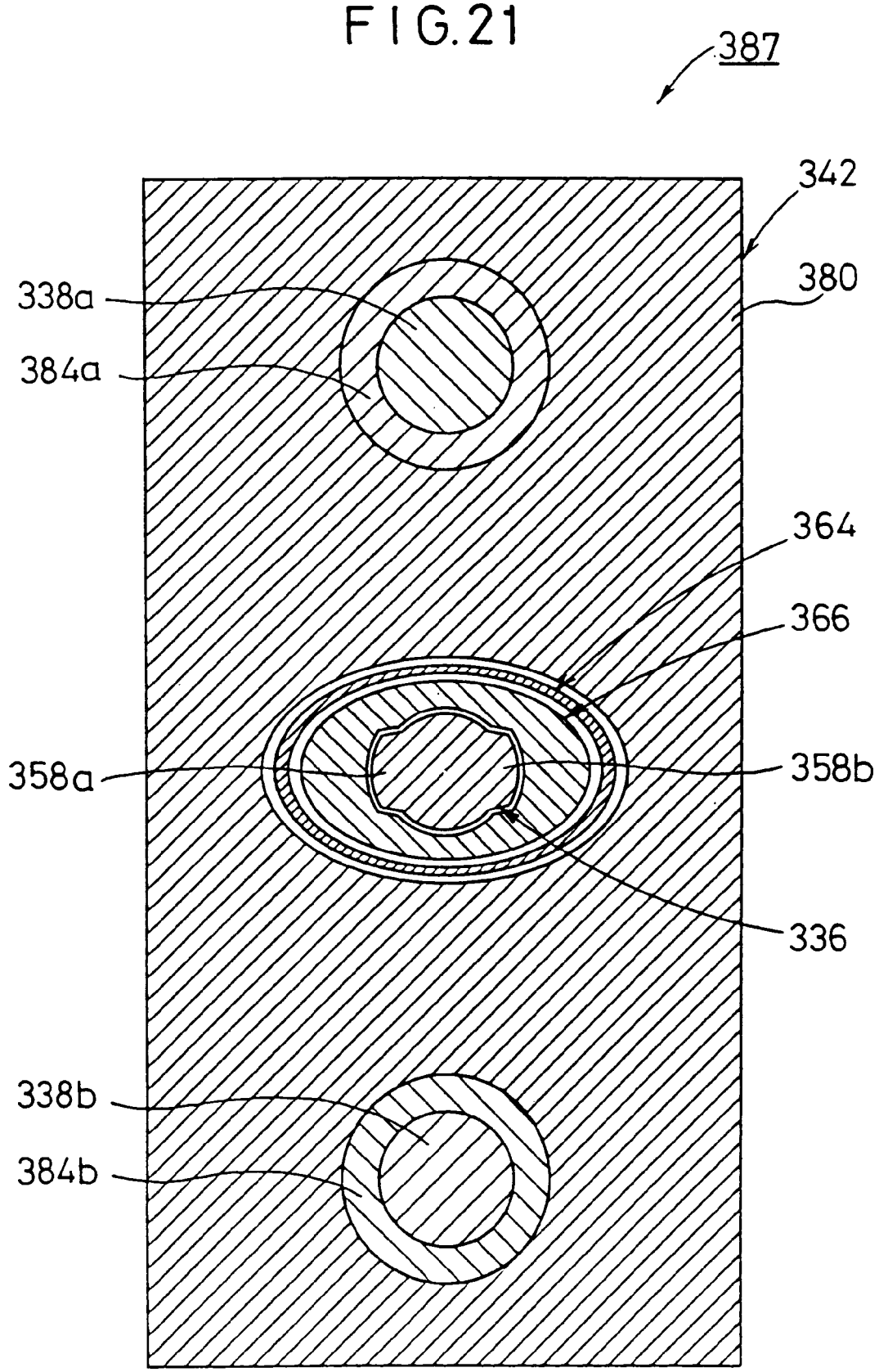
FIG. 21 shows a schematic longitudinal sectional view illustrating an actuator according to a ninth embodiment of the present invention.
Figure 22:
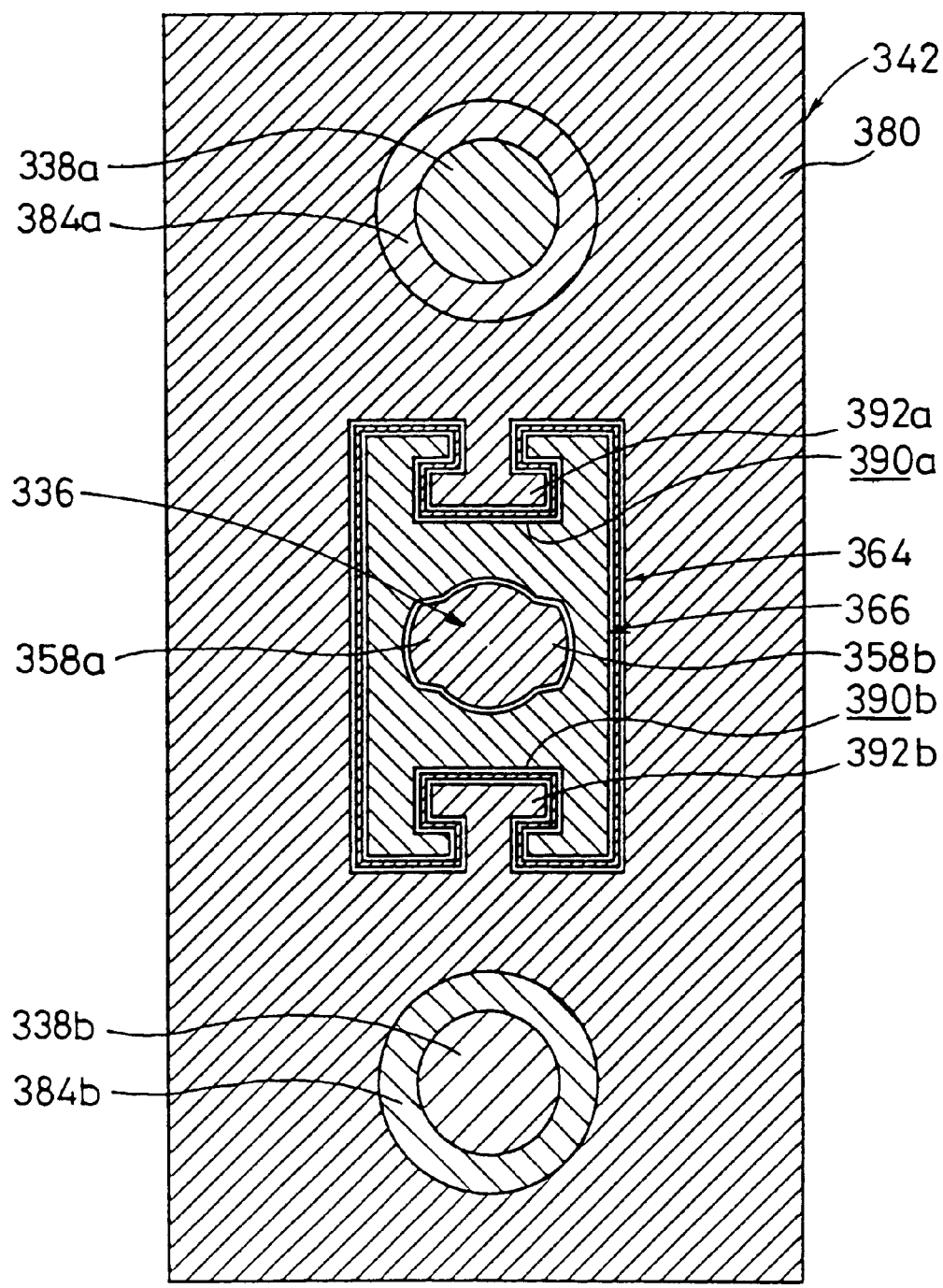
FIG. 22 shows a schematic longitudinal sectional view illustrating an actuator according to a tenth embodiment of the present invention.
Figure 23:
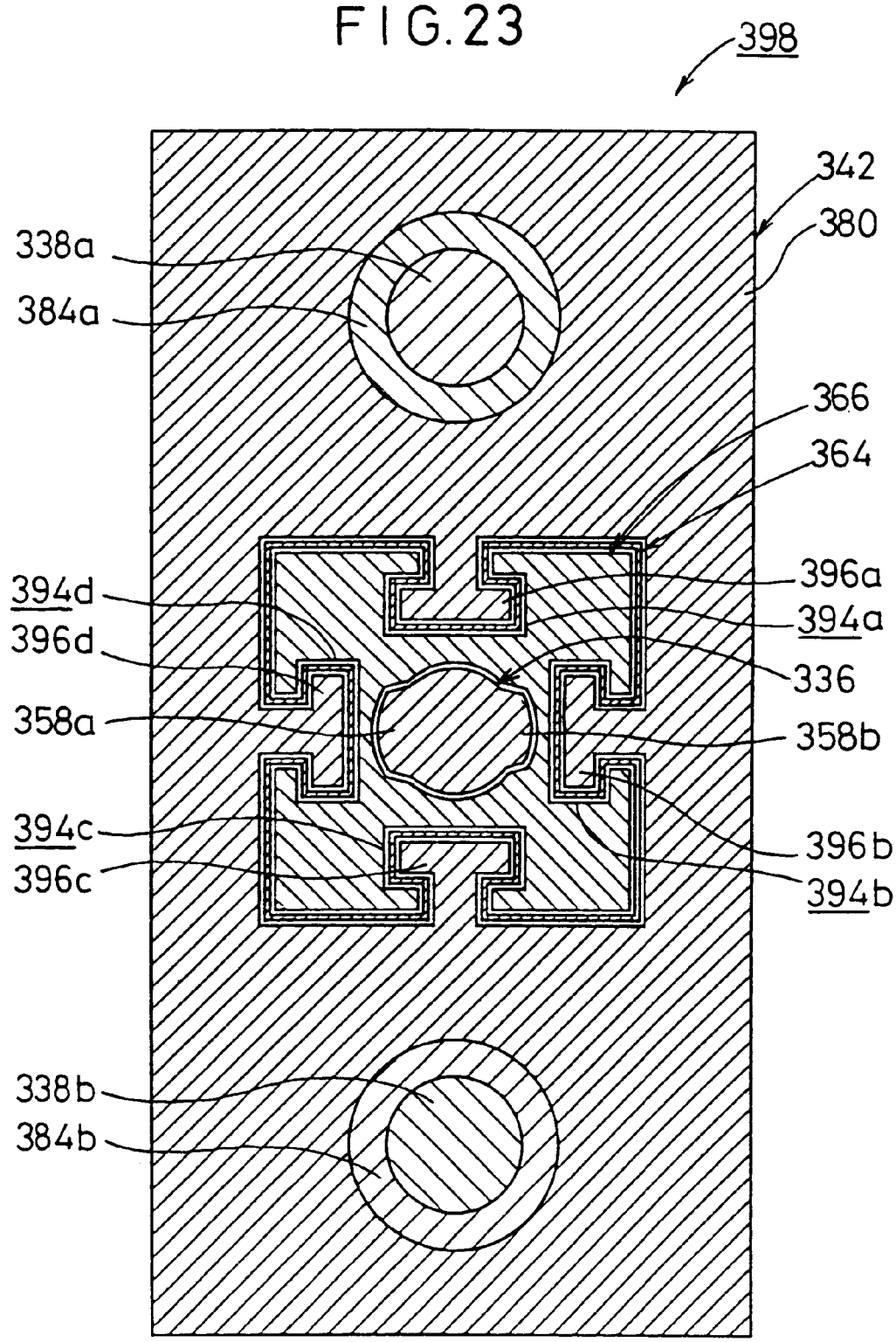
FIG. 23 shows a schematic longitudinal sectional view illustrating an actuator according to an eleventh embodiment of the present invention.

In the seventh embodiment, each of the outer circumferences of the tube 364 and the displacement member 366 and the inner circumference of the slider 380 is formed to have the spline-shaped configuration. However, each of the outer and inner circumferences may be formed to have a square cross section as in an actuator 386 according to an eighth embodiment shown in FIG. 20. Alternatively, each of the outer and inner circumferences may be formed to have an elliptical cross section as in an actuator 387 according to a ninth embodiment shown in FIG. 21. Further alternatively, an actuator 388 according to a tenth embodiment is preferably provided as follows as shown in FIG. 22. That is, outer circumferences of the tube 364 and the displacement member 366 and an inner circumference of the slider 380 are formed to have rectangular cross sections. T-shaped grooves 390a, 390b are formed on short sides of the displacement member 366. The tube 364 is formed so that it conforms with the T-shaped grooves 390a, 390b. T-shaped projections 392a, 392b, which are fitted to the T-shaped grooves 390a, 390b, are formed on the slider 380. Further alternatively, an actuator 398 according to an eleventh embodiment is preferably provided as follows as shown in FIG. 23. That is, outer circumferences of the tube 364 and the displacement member 366 and an inner circumference of the slider 380 are formed to have square cross sections. T-shaped grooves 394a to 394d and T-shaped projections 396a to 396d are formed on the respective sides thereof.

In another embodiment, the magnetic poles 360a, 360b, 362a, 362b, 370a, 370b, 372a, 372b, 374a, 374b, 382a, 382b of the feed screw 336, the displacement member 366, and the slider 380 may be formed of a resin containing a magnetic component, or they may be formed with electromagnets.

In still another embodiment, in place of the two strips of male threads 358a, 358b formed on the feed screw 336, only one strip of male thread may be formed thereon, or three or more strips of male threads may be formed thereon.

Figure 24:
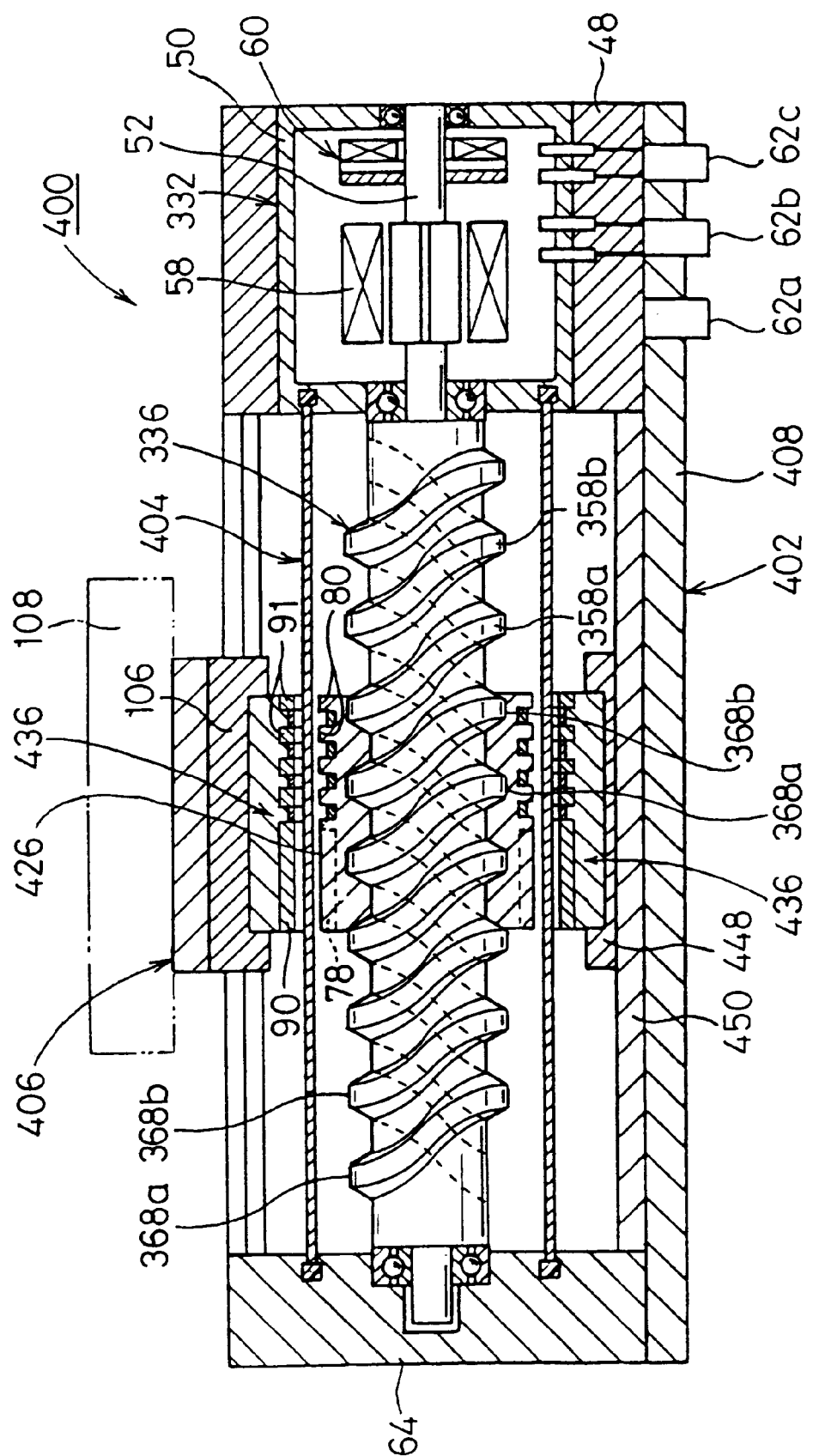
FIG. 24 shows a schematic longitudinal sectional view illustrating an actuator according to a twelfth embodiment of the present invention.

Next, an actuator 400 according to a twelfth embodiment will be explained with reference to FIG. 24.

The actuator 400 comprises a casing 402 which is formed to have a lengthy size, an AC servomotor 332 which is arranged on one end side of the casing 402, a feed screw 336 which is rotated by the AC servomotor 332, a tube 404 which surrounds the feed screw 336, and a displacement mechanism 406 which is displaceable along the longitudinal direction of the casing 402 by the aid of the feed screw 336.

The actuator 400 has the feed screw 336 which is formed with two strips of male threads 358a, 358b in the same manner as in the actuator 300 according to the seventh embodiment. The male threads 358a, 358b are meshed with female threads 368a, 368b which are formed on a displacement member 426 for constructing the displacement mechanism 406 (see FIG. 18). Magnetic poles 360a, 360b, 362a, 362b, which are formed on the feed screw 336, mutually repel magnetic poles 370a, 370b, 372a, 372b which are formed on the displacement member 426. Accordingly, the displacement member 426 and the feed screw 336 are held in a non-contact state.

The outer circumference of the displacement member 426 is formed as follows in the same manner as in the actuator 30 according to the first embodiment. That is, a plurality of driving-side axial magnetic patterns 78 are formed to protrude on one end side, and a plurality of driving-side circumferential magnetic patterns 80 are formed to protrude on the other end side (see FIGS. 3 and 4). On the other hand, a plurality of magnets 90 extending along the axial direction and a plurality of magnets 91 extending in the circumferential direction are secured to the inner circumference of a slider 436 which constitutes the displacement mechanism 406. The respective magnets 90, 91 are formed as driven-side axial magnetic patterns 92 and driven-side circumferential magnetic patterns 94 corresponding to the driving-side axial magnetic patterns 78 and the driving-side circumferential magnetic patterns 80 formed on the displacement member 426 respectively.

The slider 436 is provided with a guide block 448. The guide block 448 is slidably engaged with a rail member 450 which is secured to a base member 408 of the casing 402 (see FIG. 24). Accordingly, the slider 436 is prevented from rotation, and it is held in a non-contact state with respect to the tube 404.

When a driving signal is sent to the AC servomotor 332, the feed screw 336 is rotated. The rotary motion is transmitted to the displacement member 426. Accordingly, the displacement member 426 tends to make rotation together with the feed screw 336. However, the displacement member 426 is prevented from rotation in the circumferential direction in the same manner as in the first embodiment, because driving-side axial magnetic patterns 78 are attracted by the opposing driven-side axial magnetic patterns 92, and the driving-side axial magnetic patterns 78 are repelled by the driven-side axial magnetic patterns 92 adjacent in the circumferential direction to the opposing driven-side axial magnetic patterns 92. Therefore, the displacement member 426 is displaced only in the axial direction.

When the displacement member 426 is displaced as described above, then the driven-side circumferential magnetic patterns 94 are attracted by the opposing driving-side circumferential magnetic patterns 80, and they are repelled by the driving-side circumferential magnetic patterns 80 adjacent thereto. Thus, the slider 436 is displaced in the axial direction in accordance with the displacement action of the displacement member 426. The slider 436 is subjected to the displacement as described above.

The actuator 400 functions as follows in the same manner as in the actuator 300 according to the seventh embodiment. That is, the magnetic poles 370a, 370b, 372a, 372b of the displacement member 426 repel the magnetic poles 360a, 360b, 362a, 362b of the feed screw 336, and the displacement member 366 and the feed screw 336 are held in a non-contact state. Accordingly, the actuator 400 requires no lubricating oil, and it brings about decrease in generation of noise and dust or the like. Therefore, the actuator 400 has a long service life, and it brings about decrease in operation such as those for maintenance as well.

In the actuator 400 according to the twelfth embodiment, the driven-side axial magnetic patterns 92 and the driven-side circumferential magnetic patterns 94 of the slider 436 are formed with the magnets 90, 91, and the driving-side axial magnetic patterns 78 and the driving-side circumferential magnetic patterns 80 of the displacement member 426 are formed of the magnetic material to be attracted by the magnets 90, 91. Alternatively, the driving-side axial magnetic patterns 78 and the driving-side circumferential magnetic patterns 80 of the displacement member 426 may be formed with magnets, and the driven-side axial magnetic patterns 92 and the driven-side circumferential magnetic patterns 94 of the slider 436 may be formed of a magnetic material. Further alternatively, all of the driving-side axial magnetic patterns 78 and the driving-side circumferential magnetic patterns 80 of the displacement member 426 and the driven-side axial magnetic patterns 92 and the driven-side circumferential magnetic patterns 94 of the slider 436 may be formed with magnets. The magnets may be electromagnets.

In the actuator 400 according to the twelfth embodiment, the displacement member 426 is formed with the driving-side axial magnetic patterns 78 disposed along the axial direction and the driving-side circumferential magnetic patterns 80 disposed along the circumferential direction, and the slider 436 is formed with the driven-side axial magnetic patterns 92 and the driven-side circumferential magnetic patterns 94 which are opposed to the driving-side axial magnetic patterns 78 and the driving-side circumferential magnetic patterns 80 respectively. However, the actuator 400 according to the twelfth embodiment may be constructed as follows in the same manner as the actuator 150 according to the second embodiment. That is, a plurality of driving-side magnetic patterns 154 are arranged on an entire outer circumferential region of the displacement member 426 while being separated from each other by predetermined spacing distances in the axial direction and in the circumferential direction, and a plurality of driven-side magnetic patterns 158, which are opposed to the driving-side magnetic patterns 154, are arranged on the slider 436 while being separated from each other by predetermined spacing distances in the axial direction and in the circumferential direction (see FIG. 8).

Figure 9:
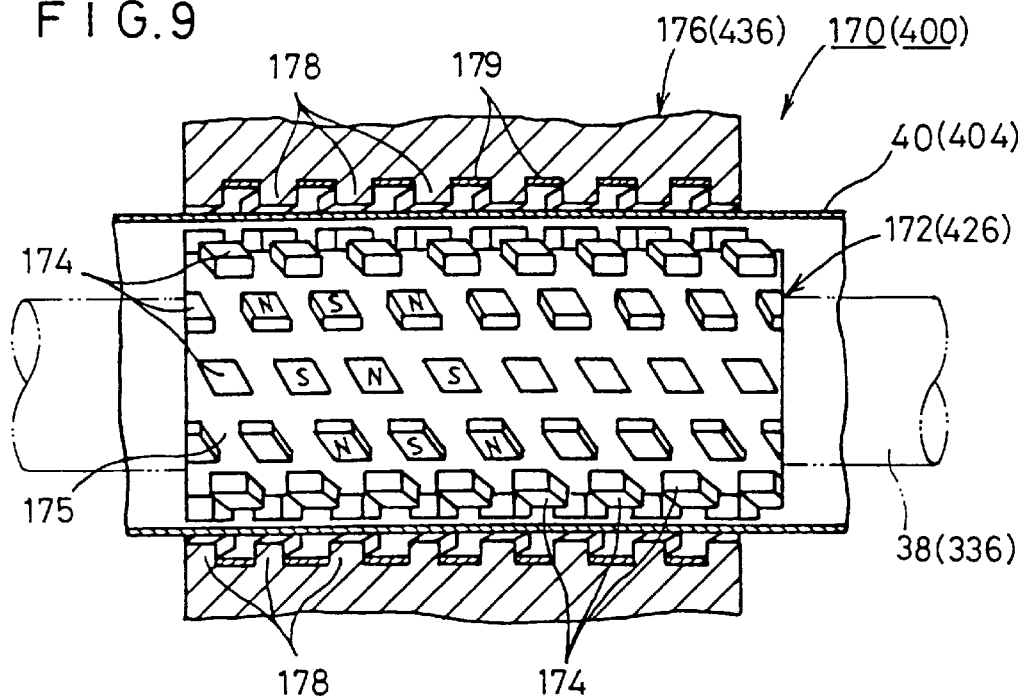
FIG. 9 shows a schematic longitudinal sectional view illustrating a displacement member and a slider of an actuator according to a third embodiment of the present invention.

In addition, the same manner as in the actuator 170 according to the third embodiment, driving-side magnetic patterns 174 and driven-side magnetic patterns 178 may be arranged while being inclined with respect to the axial direction (see FIG. 9).

Figure 10:
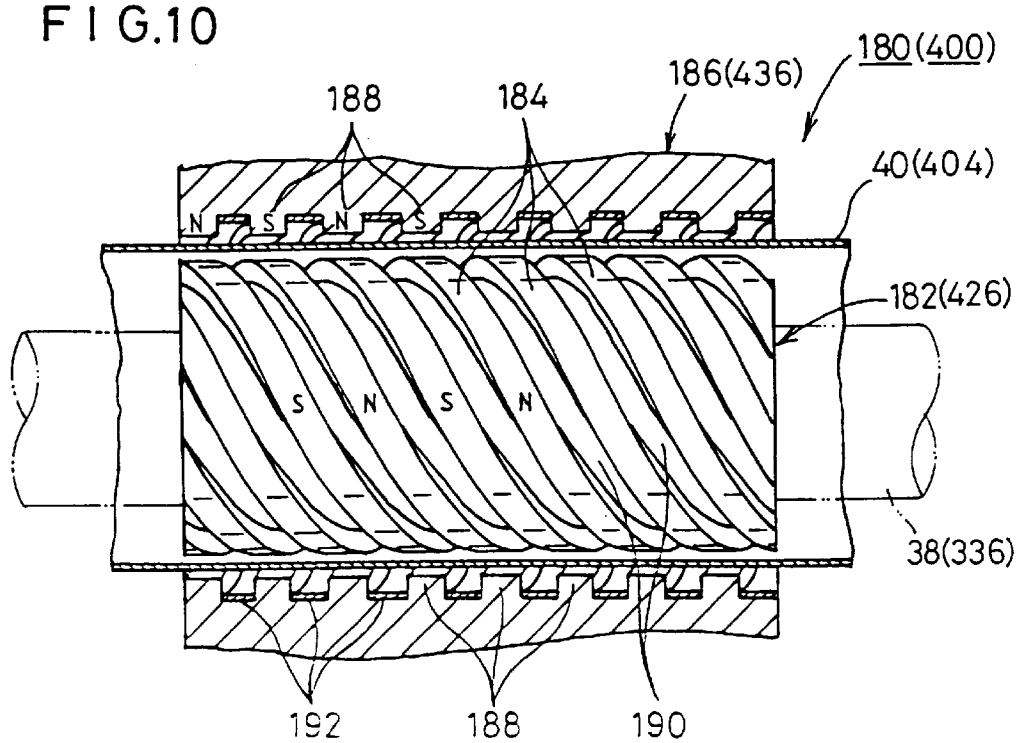
FIG. 10 shows a schematic longitudinal sectional view illustrating a displacement member and a slider of an actuator according to a fourth embodiment of the present invention.

Further, in the same manner as in the actuator 180 according to the fourth embodiment, a plurality of driving-side magnetic patterns 184 and a plurality of driven-side magnetic patterns 188 may be formed to protrude while extending in a helical configuration (see FIG. 10).

Next, an actuator 600 according to a thirteenth embodiment will be explained with reference to FIG. 25.

The actuator 600 is constructed in the same manner as the actuator 200 according to the fifth embodiment such that a feed screw 606 is surrounded by a tube 608, and both end sides of the tube 608 are closed. Thus, the feed screw 606 is isolated from the outside of the tube 608.

A displacement member 426, which is held in a non-contact state with respect to the feed screw 606, is meshed with the feed screw 606 in the same manner as in the actuator 400 according to the twelfth embodiment (see FIG. 18). Accordingly, the rotary motion of the feed screw 606 is converted into rectilinear motion by the displacement member 426.

Figure 25:
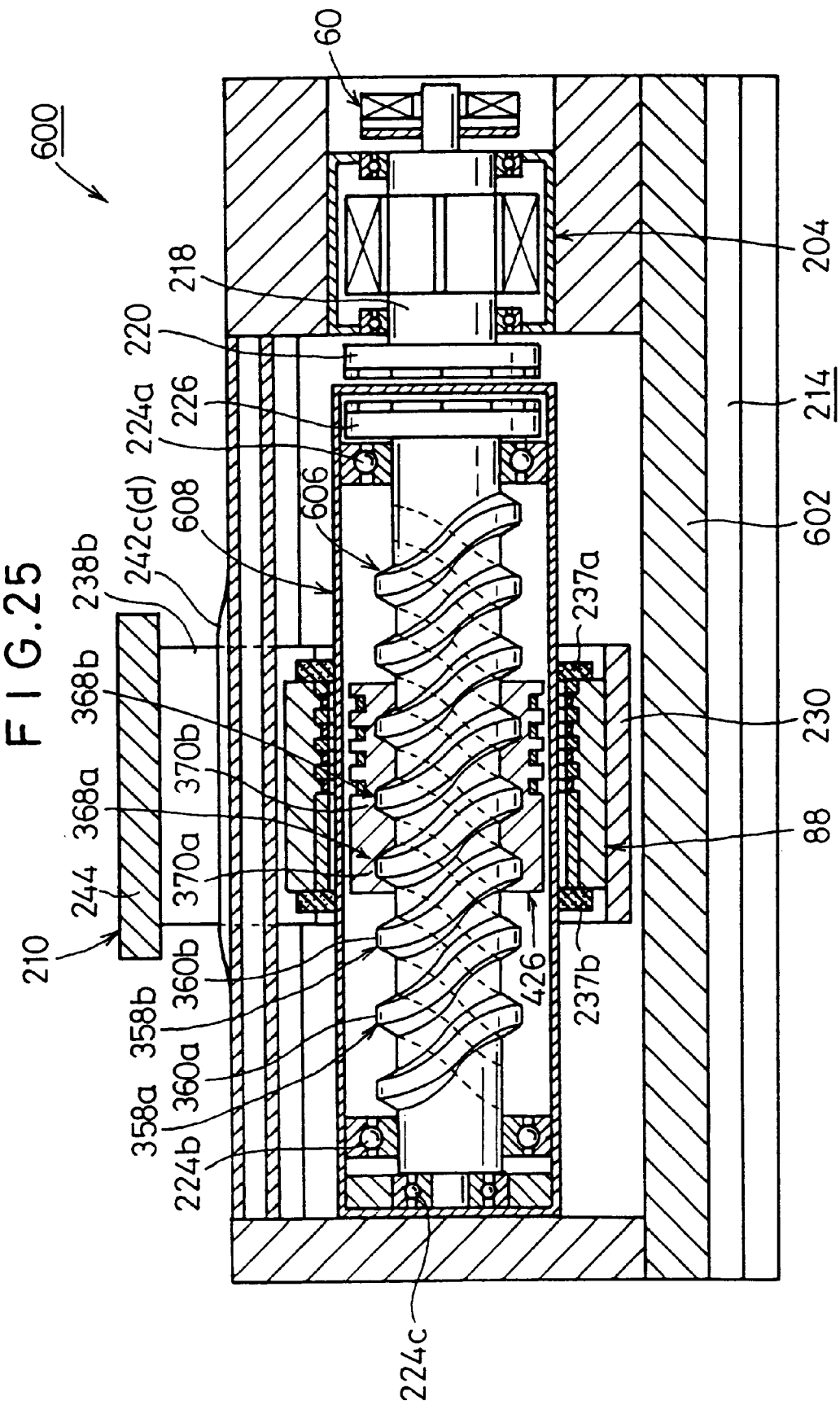
FIG. 25 shows a schematic longitudinal sectional view illustrating an actuator according to a thirteenth embodiment of the present invention.
Figure 26:
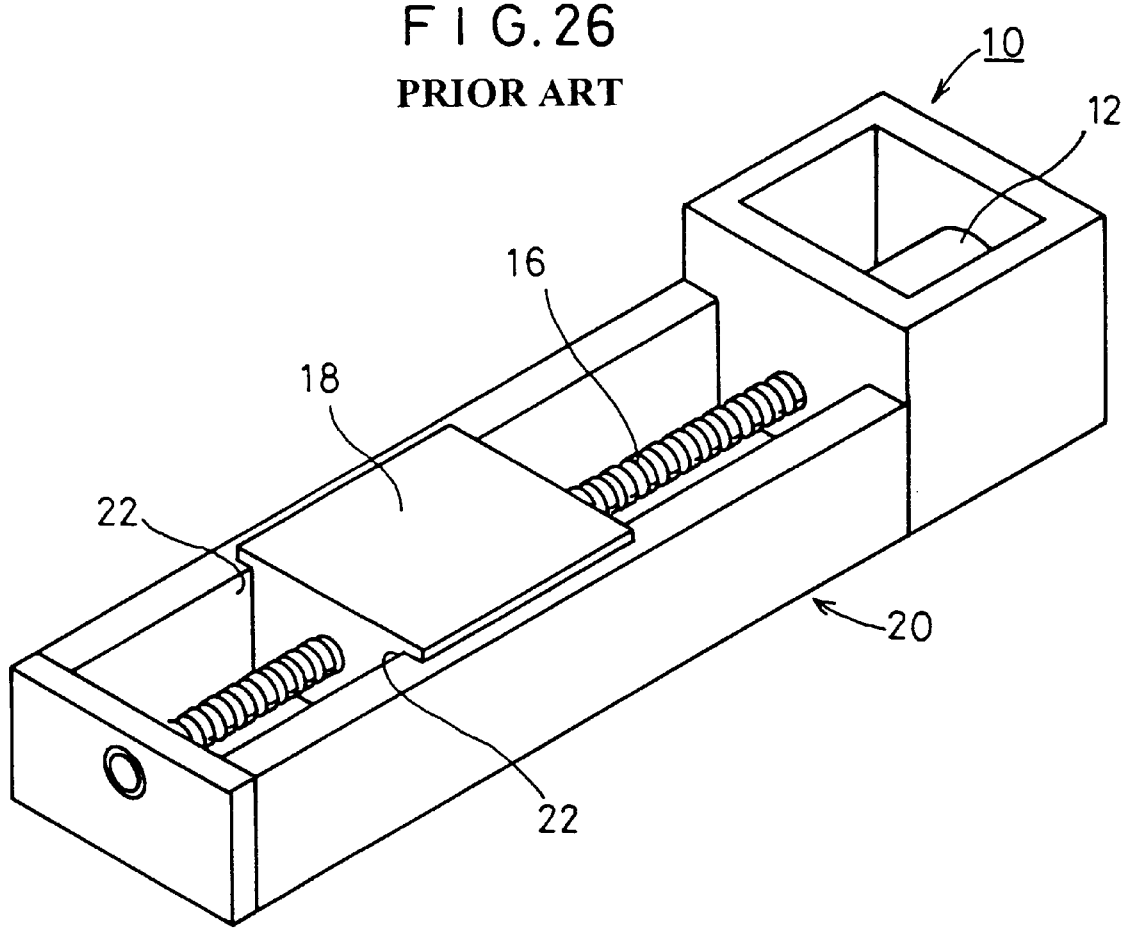
FIG. 26 shows a schematic perspective view illustrating an actuator concerning the conventional technique.

When an AC servomotor 204 is operated, a disk member 220 is rotated together with a rotary shaft 218 (see FIG. 25). The rotary motion is transmitted to the feed screw 606 owing to the mutual attraction and the mutual repulsion between magnets 222 secured to the disk member 220 and magnets 228 secured to the disk member 226 (see FIG. 13).

The rotary motion of the feed screw 606 is converted by the displacement member 426 into the rectilinear motion. A slider 88 is displaced in the axial direction in accordance with the displacement of the displacement member 426. A workpiece (not shown), which is placed on a table 244, is transported.

During this process, lubricating oil is applied to the surface of a tube 608 by the aid of lubricator members 237a, 237b. Therefore, the slider 88 smoothly slides on the outer circumference of the tube 608. Further, the lubricator members 237a, 237b adsorb dust or the like adhered to the outer circumference of the tube 608. Therefore, it is possible to eliminate any fear of trouble on the operation or the slider 88 or other components, which would be otherwise caused by the dust or the like. Further, the lubricator members 237a, 237b function to adsorb excessive lubricating oil existing on the outer circumference of the tube 608.

In the actuator 600 according to the thirteenth embodiment, the feed screw 606 is completely surrounded by the tube 608. Therefore, the actuator 600 is prevented from scattering of dust or the like from the feed screw 606 to the outside of the actuator 600. Further, the feed screw 606 is also prevented from adhesion of dust or the like.

In the actuator 600 according to the thirteenth embodiment, the plurality of magnets 222 are secured to the disk member 220 of the AC servomotor 204, while the plurality of magnets 228 are also secured to the disk member 226 of the feed screw 606. Alternatively, the following arrangement is available in the same manner as in the actuator 248 according to the sixth embodiment shown in FIG. 16. That is, a plurality of mutually opposing projections 254, 256 are formed on surfaces of respective disk members 250, 252 of the AC servomotor 204 and the feed screw 606. The respective projections 254, 256 are alternately magnetized to give the north poles and the south poles. Further, magnetic shieldings 258 are provided therebetween.

What is claimed is:

1. An actuator for converting rotary motion generated by a rotary driving source into rectilinear motion to displace a slider in accordance with an action of said rectilinear motion, said actuator comprising:

a feed screw for being rotated by said rotary driving source;

a displacement member engaged with said feed screw, for converting said rotary motion of said feed screw into said rectilinear motion; and a slider arranged in the vicinity of an outer circumference of said displacement member in a non-contact state, said slider being linearly displaceable while being interlocked with said rectilinear motion of said displacement members a plurality of magnetic poles, which are opposed to one another and which have different polarities in an axial direction of said feed screw formed on an outer circumference of said displacement member and on an inner circumference of said slider; and a magnetic coupling for preventing rotation of said displacement member about an axis of said feed screw upon rotation of said feed screw.

2. The actuator according to claim 1, wherein a plurality of magnetic poles, which have different polarities in a circumferential direction of said feed screw, are further formed on said outer circumference of said displacement member and on said inner circumference of said slider.

3. The actuator according to claim 2, wherein said magnetic poles of said displacement member comprise:

a plurality of driving-side axial magnetic patterns formed in parallel to said axial direction and separated from each other by predetermined spacing distances in said circumferential direction; and a plurality of driving-side circumferential magnetic patterns formed in parallel to said circumferential direction and separated from each other by predetermined spacing distances in said axial direction, and wherein:

said magnetic poles of said slider comprise driven-side axial magnetic patterns and driven-side circumferential magnetic patterns corresponding to said driving-side axial magnetic patterns and said driving-side circumferential magnetic patterns respectively.

4. The actuator according to claim 1, wherein said magnetic poles are arranged to have further different magnetizations in a circumferential direction of said feed screw.

5. The actuator according to claim 4, wherein said magnetic poles of said displacement member are a plurality of driving-side magnetic patterns arranged and separated from each other by predetermined spacing distances in said axial direction and in said circumferential direction, and said magnetic poles of said slider are a plurality of driven-side magnetic patterns arranged and separated from each other by predetermined spacing distances in said axial direction and in said circumferential direction corresponding to said driving-side magnetic patterns.

6. The actuator according to claim 4, wherein said magnetic poles of said displacement member are a plurality of driving-side magnetic patterns arranged and separated from each other by predetermined spacing distances in a direction inclined with respect to said axial direction, and said magnetic poles of said slider are a plurality of driven-side magnetic patterns arranged and separated from each other by predetermined spacing distances in a direction inclined with respect to said axial direction corresponding to said driving-side magnetic patterns.

7. The actuator according to claim 4, wherein said magnetic poles of said displacement member are driving-side magnetic patterns extending in a direction inclined with respect to said axial direction, and said magnetic poles of said slider are driven-side magnetic patterns extending in a direction inclined with respect to said axial direction corresponding to said driving-side magnetic patterns.

8. The actuator according to claim 1, wherein said feed screw and said displacement member are surrounded by a tube, and said outer circumference of said displacement member is opposed to said inner circumference of said slider with said tube intervening therebetween.

9. The actuator according to claim 8, wherein said slider is provided with lubricator members which abut against said tube and which are formed of any one of a porous material, a fiber material, a nonwoven material, and a sponge material, said lubricator members supply lubricating oil to said tube, and said lubricator members adsorb dust adhered to said tube.

10. The actuator according to claim 8, wherein said displacement member and said slider are formed to have spline-shaped configurations so that they are engageable with each other with said tube intervening therebetween.

11. The actuator according to claim 8, wherein said displacement member and said slider are formed to have square cross sections so that they are engageable with each other with said tube intervening therebetween.

12. The actuator according to claim 8, wherein said displacement member and said slider are formed to have elliptical cross sections so that they are engageable with each other with said tube intervening therebetween.

13. The actuator according to claim 8, wherein said displacement member is formed with T-shaped grooves, and said slider, which is opposed to said displacement member, is formed with T-shaped projections engageable with said T-shaped grooves with said tube intervening therebetween.

14. The actuator according to claim 1, wherein magnetic shieldings formed of a non-magnetic component are formed between said plurality of magnetic poles.

15. The actuator according to claim 1, wherein said magnetic poles are formed of neodymium or iron.

16. The actuator according to claim 1, wherein said magnetic poles are formed of a resin containing a magnetic component.

17. The actuator according to claim 1, wherein said magnetic poles are formed with electromagnets.

18. The actuator according to claim 1, wherein said feed screw is formed integrally with a rotary shaft of said rotary driving source.

19. The actuator according to claim 1, further comprising:
a first magnetic pole section formed at an end of a rotary shaft of said rotary driving source, said first magnetic pole section comprising magnetic poles having different polarities alternately formed along a direction of rotation; and
a second magnetic pole section formed at an end of said feed screw, said second magnetic pole section comprising magnetic poles having different polarities alternately formed along said direction of rotation, wherein:
said first magnetic pole section and said second magnetic pole section are arranged in a non-contact state at positions close to one another.

20. The actuator according to claim 1, wherein said feed screw is a ball screw, and said rotary motion of said ball screw is transmitted to said displacement member via ball members engaged with said ball screw.

21. The actuator according to claim 1, wherein male threads are formed on said feed screw, female threads meshed with said male threads are formed on said displacement member, said male threads and said female threads are formed with magnetic poles opposed to one another and having an identical pattern, and said feed screw and said displacement member are mutually held in a non-contact state by the aid of mutual repulsion effected by said respective magnetic poles.

22. The actuator according to claim 21, wherein said respective magnetic poles of said male threads and said female threads are formed to have helical configurations along peaks and/or valleys of said male threads and said female threads.

* * * * *